United States Patent
Shattil

(10) Patent No.: US 11,586,227 B2
(45) Date of Patent: Feb. 21, 2023

(54) AIRBORNE RELAYS IN COOPERATIVE-MIMO SYSTEMS

(71) Applicant: Genghiscomm Holdings, LLC, Boulder, CO (US)

(72) Inventor: Steve Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 248 days.

(21) Appl. No.: 17/123,065

(22) Filed: Dec. 15, 2020

(65) Prior Publication Data
US 2021/0373581 A1    Dec. 2, 2021

Related U.S. Application Data

(63) Continuation of application No. 16/601,498, filed on Oct. 14, 2019, now Pat. No. 10,866,596, which is a (Continued)

(51) Int. Cl.
G05D 1/10 (2006.01)
B64C 39/02 (2006.01)
(Continued)

(52) U.S. Cl.
CPC ........... *G05D 1/104* (2013.01); *B64C 39/024* (2013.01); *G05D 1/0088* (2013.01); *H04B 7/024* (2013.01);
(Continued)

(58) Field of Classification Search
CPC ........ B64C 2201/122; B64C 2201/143; B64C 2201/145; B64C 2201/146; B64C 39/024;
(Continued)

(56) References Cited

U.S. PATENT DOCUMENTS 7,123,169 B2   10/2006   Farmer et al.
7,430,257 B1    9/2008   Shattil
(Continued)

FOREIGN PATENT DOCUMENTS

KR   10-2011-0003986   1/2011
KR   10-2011-0101602   9/2011

OTHER PUBLICATIONS

Amirhossein Fereidountabar, Gian Carlo Cardarilli, Luca Di Nunzio, Rocco Fazzolari; "UAV Channel Estimation with STBC in MIMO Systems"; The International Conference on Advanced Wireless, Information, and Communication Technologies (AWICT 2015).
(Continued)

*Primary Examiner* — Tyler J Lee
(74) *Attorney, Agent, or Firm* — Steven J Shattil

(57) ABSTRACT

An unmanned aerial vehicle (UAV) uses a first baseband processor to establish a first communication link with a ground station of a wireless network and a second baseband processor that establishes a second communication link with a user device. The second baseband processor for processing a radio transmission from a user equipment. The second baseband processor is communicatively coupled to the first baseband processor such that the radio transmission is communicated to the ground station via the first communication link. Flight-control hardware steers the UAV along a flight trajectory that is determined by a ground-based UAV controller based at least on the radio transmission, such that the UAV or the ground station can locate or track the user equipment.

21 Claims, 6 Drawing Sheets

Related U.S. Application Data continuation of application No. 16/199,199, filed on Nov. 25, 2018, now Pat. No. 10,444,766, which is a continuation of application No. 15/785,692, filed on Oct. 17, 2017, now Pat. No. 10,514,709, which is a continuation of application No. 15/218,609, filed on Jul. 25, 2016, now Pat. No. 9,798,329.

(60) Provisional application No. 62/197,336, filed on Jul. 27, 2015.

(51) Int. Cl.
| | |
|---|---|
| *G05D 1/08* | (2006.01) |
| *H04B 7/02* | (2018.01) |
| *H04B 7/10* | (2017.01) |
| *H04W 24/02* | (2009.01) |
| *H04W 4/40* | (2018.01) |
| *G05D 1/00* | (2006.01) |
| *H04B 7/024* | (2017.01) |
| *H04B 7/185* | (2006.01) |

(52) U.S. Cl.
CPC .......... *H04B 7/18504* (2013.01); *H04W 4/40* (2018.02); *H04W 24/02* (2013.01); *B64C 2201/122* (2013.01); *B64C 2201/143* (2013.01); *B64C 2201/145* (2013.01); *B64C 2201/146* (2013.01)

(58) Field of Classification Search
CPC ...... G05D 1/0088; G05D 1/104; H04B 7/024; H04B 7/18504; H04W 24/02; H04W 4/40
See application file for complete search history.

(56) References Cited

U.S. PATENT DOCUMENTS

| | | | | |
|---|---|---|---|---|
| 7,868,817 | B2* | 1/2011 | Meyers | G01S 13/4454 342/36 |
| 7,898,462 | B2* | 3/2011 | Meyers | H01Q 25/00 343/705 |
| 8,254,847 | B2 | 8/2012 | Sen | |
| 8,670,390 | B2 | 3/2014 | Shattil | |
| 8,750,934 | B2 | 6/2014 | Lucidarme | |
| 8,942,082 | B2 | 1/2015 | Shattil | |
| 8,942,197 | B2 | 1/2015 | Rudnick et al. | |
| 8,955,110 | B1 | 2/2015 | Twitchell, Jr. | |
| 8,983,455 | B1 | 3/2015 | Frolov et al. | |
| 9,042,333 | B2 | 5/2015 | Shattil | |
| 9,083,425 | B1 | 7/2015 | Frolov et al. | |
| 9,302,782 | B2 | 4/2016 | Frolov et al. | |
| 9,356,727 | B2 | 5/2016 | Immendorf et al. | |
| 9,374,838 | B2* | 6/2016 | Takano | H04W 36/08 |
| 9,432,095 | B2 | 8/2016 | Berlin et al. | |
| 10,020,872 | B2 | 7/2018 | Murphy | |
| 10,444,766 | B2 | 10/2019 | Shattil | |
| 2005/0141465 | A1 | 6/2005 | Kato et al. | |
| 2005/0245240 | A1 | 11/2005 | Balasuriya et al. | |
| 2006/0235584 | A1 | 10/2006 | Fregene et al. | |
| 2008/0095121 | A1 | 4/2008 | Shattil | |
| 2009/0118875 | A1 | 5/2009 | Stroud | |
| 2009/0216757 | A1 | 8/2009 | Sen et al. | |
| 2009/0326735 | A1 | 12/2009 | Wood et al. | |
| 2010/0085235 | A1* | 4/2010 | Meyers | G01S 13/4454 342/29 |
| 2010/0087967 | A1* | 4/2010 | Meyers | H01Q 25/00 701/25 |
| 2010/0163621 | A1 | 7/2010 | Ben-Asher et al. | |
| 2010/0202575 | A1 | 8/2010 | Farag et al. | |
| 2010/0273504 | A1 | 10/2010 | Bull et al. | |
| 2011/0009053 | A1 | 1/2011 | Anglin, Jr. et al. | |
| 2011/0086638 | A1 | 4/2011 | Medapalli | |
| 2011/0141939 | A1 | 6/2011 | Medapalli | |
| 2011/0292976 | A1 | 12/2011 | Sen et al. | |
| 2012/0243510 | A1* | 9/2012 | Takano | H04W 36/0016 370/331 |
| 2012/0322360 | A1 | 12/2012 | Sen et al. | |
| 2014/0219124 | A1 | 8/2014 | Chang et al. | |
| 2014/0219449 | A1 | 8/2014 | Shattil | |
| 2014/0241239 | A1 | 8/2014 | Chang | |
| 2014/0249693 | A1 | 9/2014 | Stark et al. | |
| 2015/0009945 | A1 | 1/2015 | Shattil | |
| 2015/0140954 | A1 | 5/2015 | Maier et al. | |
| 2015/0229434 | A1 | 8/2015 | Shawn | |
| 2015/0236778 | A1 | 8/2015 | Jalali | |
| 2015/0249498 | A1 | 9/2015 | Minguez Rascon et al. | |
| 2015/0301529 | A1 | 10/2015 | Pillai et al. | |
| 2015/0336669 | A1 | 11/2015 | Kantor et al. | |
| 2015/0379874 | A1 | 12/2015 | Ubhi et al. | |
| 2016/0028471 | A1 | 1/2016 | Boss et al. | |
| 2016/0095001 | A1 | 3/2016 | Uelk et al. | |
| 2016/0100415 | A1 | 4/2016 | Mishra et al. | |
| 2016/0111006 | A1 | 4/2016 | Srivastava et al. | |
| 2016/0119052 | A1 | 4/2016 | Frerking et al. | |
| 2016/0119938 | A1 | 4/2016 | Frerking et al. | |
| 2016/0134358 | A1 | 5/2016 | Jalali | |
| 2016/0135204 | A1 | 5/2016 | Mishra et al. | |
| 2016/0142880 | A1 | 5/2016 | Talluri et al. | |
| 2016/0219506 | A1 | 7/2016 | Pratt et al. | |
| 2016/0245907 | A1 | 8/2016 | Parker et al. | |
| 2016/0300495 | A1 | 10/2016 | Kantor et al. | |
| 2016/0330771 | A1 | 11/2016 | Tan | |
| 2018/0102831 | A1 | 4/2018 | Murphy | |

OTHER PUBLICATIONS

Liu Tao, Hu Yonghui, Hua Yu, Wu Meifang; "Study on Autonomous and Distributed Time Synchronization Method for formation UAVs"; 2nd International Conference on Electrical, Computer Engineering and Electronics (ICECEE 2015).

Hamed Rezaee, Farzaneh Abdollahi; "Synchronized Cross Coupled Sliding Mode Controllers for Cooperative UAVs with Communication Delays"; 51st IEEE Conference on Decision and Control; Dec. 10-13, 2012. Maui, Hawaii, USA.

Non-Final Office Action dated Aug. 15, 2017 from corresponding U.S. Appl. No. 15/218,609.

Notice of Allowance dated Sep. 8, 2017 from corresponding U.S. Appl. No. 15/218,609.

International Search Report dated Nov. 7, 2016 from corresponding PCT Application No. PCT/US2016/043852.

Written Opinion dated Nov. 7, 2016 from corresponding PCT Application No. PCT/US2016/043852.

Non-Final Office Action dated Dec. 20, 2018 from corresponding U.S. Appl. No. 15/785,692.

R.C. Palat, et al., "Cooperative Relaying for Ad-Hoc Ground Networks Using Swarm UAVs"; MILCOM 2005—2005 IEEE Military Communications Conference; Oct. 17-20, 2005.

M.A. Marinco, et al.; "Using Cooperative MIMO Techniques and UAV Relay Networks to Support Connectivity in Sparse Wireless Sensor Networks"; 2013 International Conference on Computing, Management and Telecommunications (ComManTel), Jan. 21-24, 2013.

Extended European Patent Office Search Report, Appl. No. 16831186.8, dated Feb. 21, 2019.

European Patent Office communication pursuant to Article 94(3) EPC, Appl. No. 16831186.8, dated Jun. 24, 2020.

Office Letter from State of Israel Ministry of Justice, The Patent Authority, Appl. No. 256934, dated Sep. 13, 2021.

Office Letter from Japan Patent Office, Appl. No. 2018-525504, dated May 22, 2020.

Notice of Allowance dated Nov. 6, 2019 from corresponding U.S. Appl. No. 15/785,692.

Non-Final Office Action dated Jul. 19, 2019 from corresponding U.S. Appl. No. 16/199,199.

Notice of Allowance dated Aug. 28, 2019 from corresponding U.S. Appl. No. 16/199,199.

Non-Final Office Action dated Sep. 28, 2020 from corresponding U.S. Appl. No. 16/601,498.

(56) References Cited

OTHER PUBLICATIONS

Notice of Allowance dated Oct. 30, 2020 from corresponding U.S. Appl. No. 16/601,498.
Office Action dated Oct. 20, 2020 from China National Intellectual Property Administration regarding Appl. No. 201680043885.0.
Notification to Grant Patent Right for Invention dated Dec. 7, 2020 from China National Intellectual Property Administration regarding Appl. No 201680043885.0.
Supplementary European Search Report from European Patent Office dated Feb. 21, 2019 regarding Appl. No. 16831186.8.
Communication Pursuant to Article 94(3) EPC dated Jun. 24, 2020 from European Patent Office regarding Appl. No. 16831186.8.
Communication Pursuant to Article 94(3) EPC dated Jun. 16, 2021 from European Patent Office regarding Appl. No. 16831186.8.
Notification No. 26 dated Sep. 3, 2021 from Israel Ministry of Justice, The Patent Authority, regarding Appl. No. 256934.
Notice of Reasons for Refusal dated May 22, 2020 from Japan patent office, regarding Appl. No. 2018-525504.
Decision to Grant a Patent dated Jun. 7, 2021 from Japan patent office, regarding Appl. No. 2018-525504.

* cited by examiner

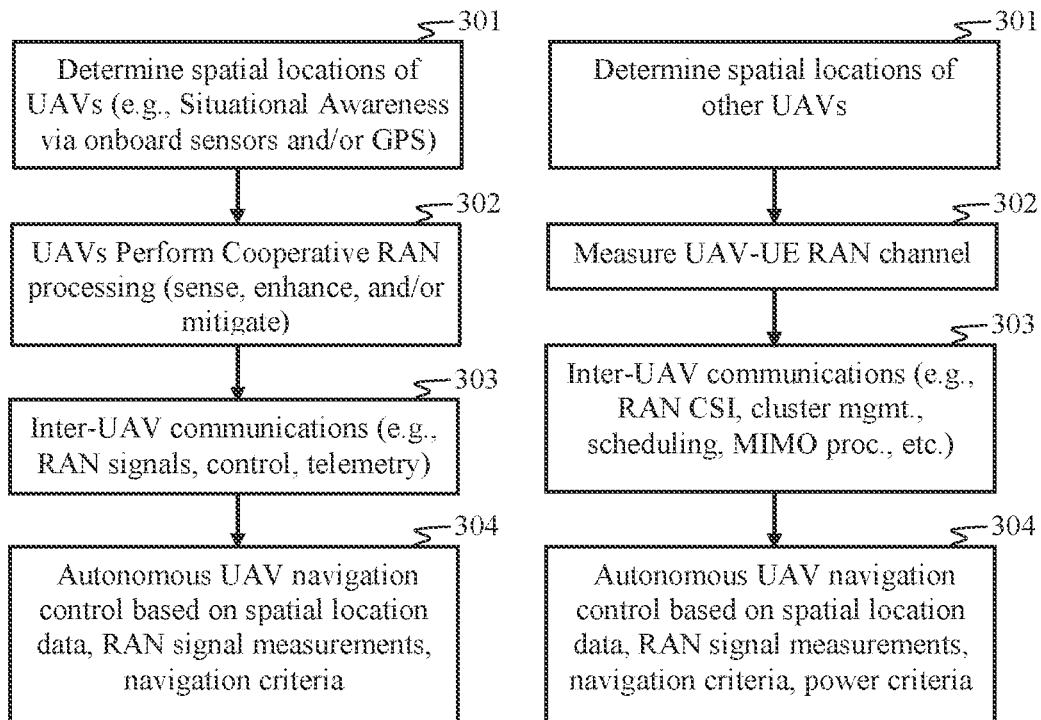
Figure 3A
Figure 3B
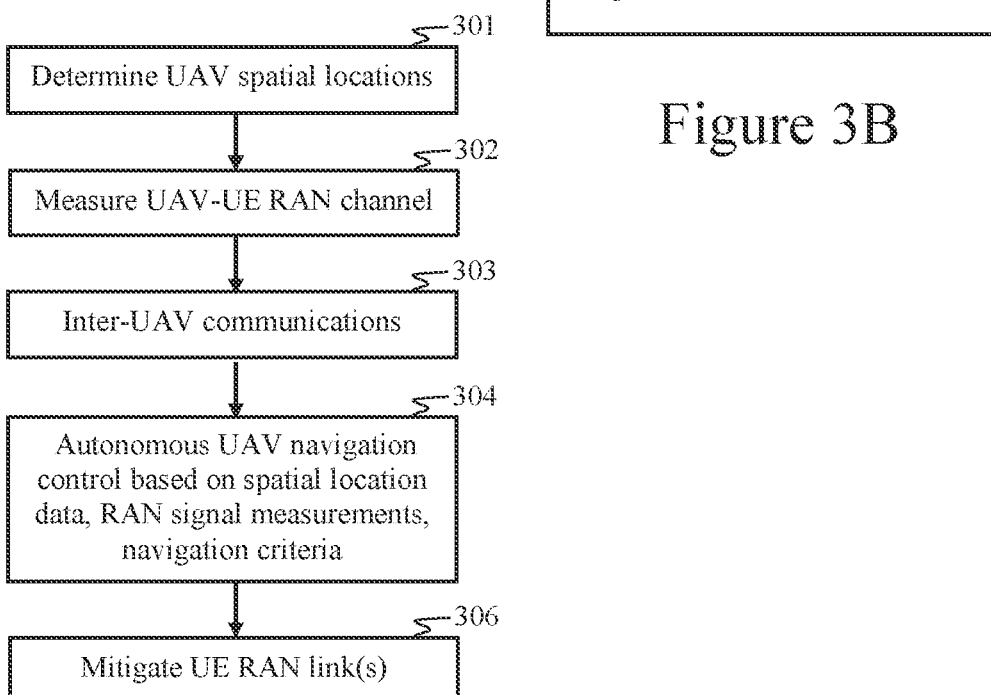
Figure 3C

AIRBORNE RELAYS IN COOPERATIVE-MIMO SYSTEMS

CROSS REFERENCE TO RELATED APPLICATIONS

This application is a Continuation of U.S. patent application Ser. No. 16/601,498, filed Oct. 14, 2019, now U.S. Pat. No. 10,866,596, which is a Continuation of U.S. patent application Ser. No. 16/199,199, filed Nov. 25, 2018, now U.S. Pat. No. 10,444,766, which is a Continuation of U.S. patent application Ser. No. 15/785,692, filed Oct. 17, 2017, now U.S. Pat. No. 10,514,709, which is a Continuation of U.S. patent application Ser. No. 15/218,609, filed Jul. 25, 2016, now U.S. Pat. No. 9,798,329, which claims priority to U.S. Provisional Application 62/197,336, filed Jul. 27, 2015, each of which is expressly incorporated by reference in its entirety.

FIELD OF THE INVENTION

The present invention relates, in general, to control of unmanned aerial vehicles (UAVs), and, more particularly, to control methods and systems for use with swarms of UAVs configured to function as relays in a radio access network.

BACKGROUND

The background description includes information that may be useful in understanding the present invention. It is not an admission that any of the information provided herein is prior art or relevant to the presently claimed invention, or that any publication specifically or implicitly referenced is prior art.

There is a growing interest in utilizing unmanned aerial vehicles (UAVs), such as remotely controlled drones/airplanes, helicopters, and multicopters, to perform a wide variety of tasks. An ongoing challenge, though, is how to better control the UAVs for each of these particular uses.

In some applications, it is desirable or useful to perform a task through the use of two or more UAVs that are controlled in a centralized or organized manner. For example, swarm control may be used to control the UAVs as they fly over a targeted geographical area. A swarm can be thought of as a self-organizing particle system with numerous autonomous, reflexive agents (e.g., UAVs are the particles) whose collective movements may be determined by local influences, such as wind and obstacles (such as another nearby UAV). The UAVs are independent and are often locally controlled, which may include communicating with a nearby UAV to determine which one moves or whether both should move to avoid an impending collision.

Formations of multi-agent systems can be controlled based on two main approaches—namely: centralized and decentralized. The centralized approach has the merit of global information that each agent can receive through a central controller. In the decentralized approach, each agent has a local controller which increases its reliability. A decentralized approach can also be useful when global information is not available.

In the context of flight management, synchronization is agreement in time or simultaneous operation, which is an important concept in the control of dynamical systems. An important technique to improve synchronization performance is cross coupling, which is based on sharing the feedback information of control loops, and it has many applications in the motion synchronization of multi-axis and cooperative manipulator robots. On the one hand, coupling with more agents provides a better motion synchronization; on the other hand, communication range of agents restricts the agents with whom an agent can be coupled.

The use of UAVs for achieving high-speed wireless communications is expected to play an important role in future communication systems. In a radio access network (RAN), UAVs equipped with RAN transceivers can be used to quickly deploy RAN services and provide reliable broadband network infrastructure with lower CAPEX and OPEX compared to terrestrial cellular networks. For example, such UAVs can function as relays between a ground-based base transceiver station (BTS) and one or more user equipments (UEs).

The high mobility of UAVs can result in highly dynamic network topologies, which are usually sparsely and intermittently connected. As a result, effective multi-UAV coordination, or UAV swarm operations, should be designed to ensure reliable network connectivity.

Another challenge stems from the size, weight, and power constraints of UAVs, which limit their communication, computation, and endurance capabilities. To address such issues, energy-aware UAV deployment and operation mechanisms are needed for intelligent energy usage and replenishment. Moreover, due to the mobility of UAVs, as well as the lack of fixed backhual links, interference coordination among neighboring cells with UAV-enabled aerial base stations is more challenging than in terrestrial cellular systems. While conventional wisdom might call for effective interference management techniques for UAV-aided cellular coverage, Cooperative Multiple-Input Multiple Output (MIMO) has been shown to exploit interference to provide dramatic improvements to RAN performance.

In 2001, Shattil introduced Coordinated Multipoint (U.S. Prov. Appl. No. 60/286,850) with joint MIMO processing between cooperating BTSs. This enables universal frequency reuse whereby the full RAN spectrum can be used to serve each and every UE. In 2002, Shattil introduced Cloud-RAN (U.S. Pat. No. 7,430,257) wherein Software Defined Radio (SDR) is implemented via distributed computing in a Coordinated Multipoint system. In 2002 and 2004, Shattil described client-side Cooperative MIMO (U.S. Pat Pub. 20080095121 and U.S. Pat. No. 8,670,390). By employing Cooperative MIMO at both ends of a RAN link, the total data bandwidth per UE is no longer limited by the RAN spectrum. Rather, it is determined by the short-range, high-bandwidth fronthaul network that connects cooperating devices. This solves one of the most important problems in radio communications. Each of the references mentioned herein is incorporated by reference in its entirety.

In order for UAVs to serve in a Cooperative-MIMO network, for example, the UAVs could be coordinated spatially to ensure and/or enhance RAN performance. UAV control for RAN applications could include providing for communications between UAVs, providing for synchronization, cluster formation, as well as other control and/or sensing capabilities which are also essential for swarm management. Hence, there is a need to enable a behavioral structure for swarm management configured for multi-objective missions that include RAN performance enhancement, and can further comprise flight management, target seeking, obstacle avoidance, as well as others.

SUMMARY

Wireless communication systems that include UAVs promise to provide cost effective wireless connectivity for devices without infrastructure coverage. Compared to terrestrial communications or those based on high-altitude platforms (HAPs), on-demand wireless systems with low-altitude UAVs are faster to deploy, more flexibly re-configured, and are likely to have better communication channels. Aspects of the disclosure address many of the challenges of using highly mobile and energy constrained UAVs for wireless communications.

Aspects of the disclosure describe cooperative-MIMO processing, which can comprise MIMO processing wherein the multiple input (MI) comprises downlink transmissions from multiple UAVs and the multiple output (MO) comprises uplink transmissions to multiple UAVs. Further aspects of the disclosure indicate that cooperative-MIMO processing can employ UEs, BTSs, and/or relay nodes, such as UAVs. In accordance with some aspects, combinations of BTSs, UAVs, UEs, and at least one central processor (CP) are configured to perform cooperative-MIMO processing.

In some aspects, a UAV comprises a situational awareness system coupled to at least one onboard sensor and configured to sense the location of other UAVs. A cooperative Radio Access Network (RAN)-signal processor is configured to process RAN signals in a UAV-User Equipment (UE) channel cooperatively with at least one other UAV to produce RAN performance criteria, the cooperative processing providing for increased rank of the UAV-UE channel. A flight controller is coupled to the situational awareness system and the cooperative RAN-signal processor, and employs autonomous navigation control of the UAV's flight based on the relative spatial locations of other UAVs and based on the RAN performance criteria operating within predetermined boundaries of navigation criteria. As used herein, RAN performance criteria can include RAN mitigation performance criteria. In some aspects, the UAV is configured to employ mitigation tactics against one or more UEs identified as a threat and may coordinate other UAVs to conduct such mitigations. RAN performance criteria can be employed as RAN mitigation criteria, and the flight controller can enhance RAN mitigation performance by adapting the autonomous navigation control. Transmitter and receiver apparatuses configured to perform the aforementioned operations can be employed in aspects of the disclosure.

The following patent applications are incorporated by reference in their entireties: Appl. Nos. 60/286,850, filed Apr. 26, 2001; Ser. No. 10/131,163, filed Apr. 24, 2002; Ser. No. 10/145,854, filed May 14, 2002; Ser. No. 11/187,107, filed Jul. 22, 2005; Ser. No. 14/168,442, filed Jan. 27, 2015; Ser. No. 14/709,936, filed May 12, 2015, 62/233,982, filed Sep. 28, 2015; and 62/252,717 filed Nov. 9, 2015.

BRIEF DESCRIPTION OF THE DRAWING

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIGS. 3A, 3B, and 3C depict flow diagrams that illustrate methods according to aspects of the disclosure.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Descriptions of various terms (including "fronthaul," "precoding," "UE," "BTS," "Node," and "CP") used throughout the disclosure can be found in U.S. Prov. Appl. No. 62/197,336, filed Jul. 27, 2015, which is incorporated by reference in its entirety.

Figure 1:
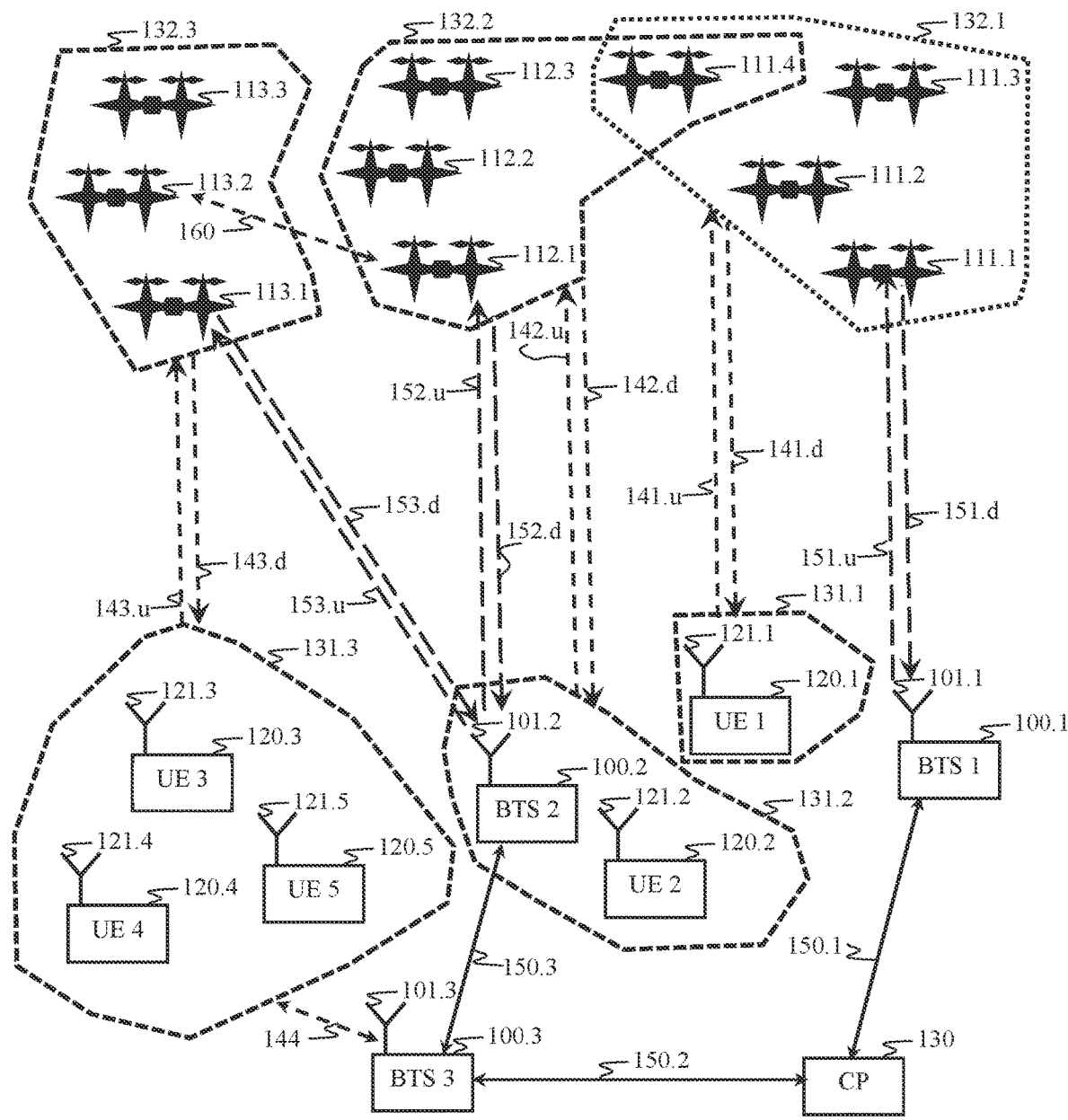
FIG. 1 is a block diagram of a network topology in accordance with an aspect of the disclosure.

One of the features of a MIMO system in accordance with some aspects of the disclosure is a multipath communication channel comprising multiple active scattering platforms, such as depicted in FIG. 1 by a plurality of airborne relay stations (e.g., UAVs) 111.1-111.4, 112.1-112.3, and 113.1-113.3. Active scattering platforms can serve to increase the rank of the RAN channel matrix in the forward and/or reverse link between BTS(s) and UE(s). As a result, a multipath propagation channel from a source (e.g., one or more BTSs 100.1 and 100.2) to multiple destinations (e.g., UEs 120.1-120.5) will not only be measurable, but also controllable via these active scattering platforms 111.1-111.4, 112.1-112.3, and 113.1-113.3 to more efficiently provide frequency reuse among multiple users 120.1-120.5 via discriminative propagation features. Some aspects of the disclosure provide means for multiple users to re-use allocated spectrum concurrently in MIMO communication configurations and enable these users to share allocated resources dynamically and efficiently.

In a first general aspect, the UEs 120.1-120.5 employ a RAN to communicate with one or more BTSs 101.1 and 101.2 via the active scattering platforms 111.1-111.4, 112.1-112.3, and 113.1-113.3. Radio uplinks are indicated by links 141.*u*, 142.*u*, and 143.*u*, and radio downlinks are indicated by links 141.*d*, 142.*d*, and 143.*d*. However, one or more of these downlinks may employ optical communications. Communications between the active scattering platforms 111.1-111.4, 112.1-112.3, and 113.1-113.3, such as indicated by link 160, can comprise any of various short-range broadband wireless links, including (but not limited to) WPAN and WLAN radio technologies, and optical communication technologies. Downlinks from the active scattering platforms 111.1-111.4, 112.1-112.3, and 113.1-113.3 to the BTSs 101.1 and 101.2 are denoted by links 151.*d*, 152.*d*, and 153.*d*. Uplinks from the BTSs 101.1 and 101.2 to the active scattering platforms 111.1-111.4, 112.1-112.3, and 113.1-113.3 are denoted by links 151.*u*, 152.*u*, and 153.*u*. It should be appreciated that the links 151.*d*, 152.*d*, 153.*d*, 151.*u*, 152.*u*, and 153.*u* may comprise optical and/or radio communication links.

Any of the methods and devices described herein may be implemented in a network configuration embodied by this first general aspect, as well as in network configurations that are configured in accordance with particular aspects of the disclosure. While the first general aspect can be inferred from FIG. 1, additional aspects, such as network configurations that employ HAPs and/or satellites to communicate with the active scattering platforms may be provided.

In one aspect, the UEs 120.1-120.5 are configured in cooperative groups (e.g., user groups 131.1-131.3) wherein the UEs within each group coordinate operations, share resources, or otherwise cooperate to process signals in the RAN. In another aspect, the active scattering platforms 111.1-111.4, 112.1-112.3, and 113.1-113.3 are organized in clusters 132.1-132.3 and may provide for inter-cluster and/or intra-cluster communications. Platforms within each cluster may be configured to cooperate with each other, such as to coordinate and/or collaborate for processing signals communicated with the UEs 120.1-120.5, signals exchanged between the clusters 132.1-132.3, and/or signals exchanged with the BTSs 100.1 and 100.2.

In another aspect, the BTSs 100.1-100.3 are communicatively coupled to a CP 130 configured to perform at least some of the signal-processing operations required by the BTSs 100.1-100.3, the active scattering platforms 111.1-111.4, 112.1-112.3, and 113.1-113.3, and/or the UEs 120.1-120.5. Such signal processing can be implemented in a software-defined radio (SDR) which resides within a cloud computing architecture, such as servers in one or more data centers. In some aspects, distributed computing may be effected via devices communicatively coupled together throughout the network, such as the UEs 120.1-120.5, the active scattering platforms 111.1-111.4, 112.1-112.3, and 113.1-113.3, and/or other network devices.

By employing central processing, a variety of signal processing tasks ranging from complex global operations to many types of local operations can be pooled. This can reduce the cost, power needs, and/or processing requirements of edge devices, such as BTSs and active scattering platforms, relay nodes, etc. In some aspects, certain operations are better suited to be performed at the network edges. For example, edge-distributed operations can reduce latency and communication bandwidth requirements. Various cost estimations and other evaluation algorithms can be used to determine which operations to perform at the edges and when to perform them. In some aspects, edge processing can comprise simple operations, but when viewed from a global perspective, exhibit complex collective intelligence. In some aspects of the disclosure, combinations of edge processing and centralized processing can be performed to achieve an equitable (e.g., improved) balance between simplifying edge devices, achieving adequate responsiveness to changing conditions, and maintaining manageable fronthaul loads.

Another aspect illustrated in FIG. 1 employs the concept of device-agnostic cooperation. Specifically, devices can be configured to change their roles, such as to serve multiple purposes. By way of example, group 131.2 comprises UE 120.2 and BTS 101.2. In one aspect, the UE 120.2 cooperates with the BTS 101.2 to function as an extra RAN antenna(s) for the BTS 101.2 array. The UE 120.2 might employ a wireless fronthaul link to communicate directly with the BTS 101.2, such as to coordinate transmission and/or reception in the RAN. Similarly, the BTS 101.2 could be configured to assist the UE 120.2, such as by increasing the channel matrix rank for cooperative subspace processing operations in the RAN. In another example, one or more of the active scattering platforms 111.1-111.4, 112.1-112.3, and 113.1-113.3 might form a cooperative array with any of the UEs 120.1-120.5, any of the BTSs 100.1-100.3, or any combinations thereof. For example, an active scattering platform might join a UE group to assist in cooperative MIMO processing of RAN signals for the group. An active scattering platform could join one or more BTSs to function as a cooperative base transceiver array. In some aspects, UEs and/or BTSs could join a cluster of active scattering platforms and assist in relaying wireless signals to another cluster of active scattering platforms.

Also depicted in FIG. 1 is a network wherein the RAN channel is provided by both terrestrial base transceiver communications (such as depicted by link 144 from BTS 100.3) and active scattering platforms (such as RAN links 143.0 and 143.*d* from the active scattering platform group 132.3. In such aspects, cooperative MIMO subspace processing can be performed at the CP 130, which also coordinates the cooperating RAN nodes (e.g., BTS 100.3 and scattering platform group 132.3) for transmitting precoded RAN signals and/or receiving RAN signals.

While the UEs 120.1-120.5 and the BTSs 100.1-100.3 are depicted having antenna systems (121.1-121.2 and 101.1-101.3, respectively), other types of wireless transceivers can be employed. For example, some of the links (such as, but not limited to, 151.*u*, 151.*d*, 152.*u*, 152.*d*, 153.*u*, and 153.*d*) may comprise optical links. Thus, LEDs and photodetector arrays (or other suitable optical transceivers) can be employed as transceivers. While each of the antenna systems 121.1-121.2 and 101.1-101.3 may comprise one or more antennas, optical transceivers can include singular or multiple light transmitters and singular or multiple light detectors. It should be appreciated that each of the active scattering platforms 111.1-111.4, 112.1-112.3, and 113.1-113.3 comprises some sort of wireless transceiver apparatus, such as at least one antenna, and optionally, at least one optical transmitter, and at least one optical receiver.

In accordance with some aspects of the disclosure, the BTS 100.1-100.2 transceiver apparatus 101.1-101.2 can comprise lamps, spotlights, traffic signals, street lights, and/or other types of ubiquitous lighting, wherein such ubiquitous light sources are modulated with data to provide the uplinks 151.*u*, 152.*u*, and 153.*u*. In some aspects, at least some of the communication links (e.g., uplinks 151.*u*, 152.*u*, and 153.*u*) can be multi-purpose in terms of providing additional functions besides communications. For example, in one aspect, the uplinks 151.*u*, 152.*u*, and 153.*u* provide power to at least some of the active scattering platforms 111.1-111.4, 112.1-112.3, and 113.1-113.3. In another aspect, the uplinks 151.*u*, 152.*u*, and 153.*u* supply synchronization signals (or other control signals) to at least some of the active scattering platforms 111.1-111.4, 112.1-112.3, and 113.1-113.3. In another aspect, the uplinks 151.*u*, 152.*u*, and 153.*u* may provide for locating, tracking, and/or directing the active scattering platforms 111.1-111.4, 112.1-112.3, and 113.1-113.3.

In accordance with another aspect, the active scattering platforms 111.1-111.4, 112.1-112.3, and 113.1-113.3 may organize themselves into groups (or clusters) 132.1-132.3 and/or they may be organized into their respective groups by ground operations (e.g., the CP 130). In some aspects, each group can have a cluster head (e.g., each of the active scattering platforms 111.1, 112.1, and 113.1 might function as a cluster head for its respective group 132.1, 132.2, and 132.3). Each cluster head 111.1, 112.1, and 113.1 can provide services to other members of its respective group, including (but not limited to) synchronizing the other members, communicating with BTSs on behalf of the group, organizing group operations in accordance with command and control signals received from ground units, controlling communications within the group, controlling communications between groups, performing central processing operations for the group, coordinating the group to communicate via the RAN with the UEs and/or BTSs, determining heading for the group, organizing the group's flight formation, performing computational and/or power load balancing among group members, and/or transferring control responsibilities to another group member.

In some aspects, an active scattering platform (e.g., 111.4) can belong to more than one group (e.g., 132.1 and 132.2). The platform 111.4 can receive and process control information from multiple cluster heads (e.g., 111.1 and 112.1). The platform 111.4 may disregard at least some of the commands and control signals from at least one of the multiple cluster heads 111.1 and 112.1. In some aspects, the platform 111.4 may select which cluster head to receive control information from. In some aspects, another device (e.g., a cluster head, a BTS, a UE, and/or the CP) determines which cluster head(s) provide which control signals to the platform 111.4.

In the description that follows, "forward link" describes the communication path from the BTS(s) to the UE(s), which can include a forward uplink (e.g., link 151.*u*), any communication link(s) between the active scattering platforms (e.g., relay channels, such as link 160), and a forward downlink (e.g., link 143.*d*) to the UE(s). The forward link can also include the communication links between the CP and the BTSs.

The "reverse link" describes the communication path from the UE(s) to the BTS(s), which can include a reverse uplink (e.g., link 143.*u*), any communication link(s) between the active scattering platforms (e.g., relay channels, such as link 160), and a reverse downlink (e.g., link 143.*u*) to the BTS(s). The forward link can also include the communication links between the BTSs and the CP.

Relay channels may be characterized by what they do to the message from a source node, such as amplify-and-forward (AF), decode-and-forward (DF), or filter-and-forward (FF); each with different challenges in terms of the presence of noise, algorithm complexity, and required node information. The active scattering platforms can provide for a multipath-dominant channel wherein at least some of the multipaths are through the active scattering platforms. In some aspects, these platforms are in parallel paths providing amplifications, delays, and directional adjustments from a source to a destination (e.g., UEs and BTSs). In some aspects, the sources and destinations are on the ground, and the airborne platforms serve as bent-pipe transponders, which perform receiving, low-noise-amplifying, filtering, frequency translating, power-amplifying, and re-radiating functions for serving signals.

In some aspects, MIMO configurations feature a point-to-point architecture with a source at a communication hub via radiations from multiple BTSs to a destination in a common coverage of the BTSs, the airborne platforms, or some combination thereof. In some aspects, the MIMO configurations feature a point-to-multipoint architecture with a source at a communication hub via radiations from multiple BTSs to multiple destinations in a common coverage of the BTSs, the airborne platforms, or some combination thereof.

In accordance with certain aspects, the MIMO systems utilize composite transfer functions selected and characterized based on channel state information (CSI), which can comprise responses from probing signal sequences for a propagation channel dominated by multipath. Each propagating path features a set of unique transponding function, and the composited transfer functions can be constructed or shaped to be "user dependent" with enhanced responses to a selected user and (optionally) suppressed ones for other users. In some aspects, when operating in coordinated modes, cooperating UEs are configured to suppress interference to other UEs using the same frequency resources as the RAN or by communicating information via a local area network to effect baseband cancellation.

As first described in Applicant's '850 patent application, distributed multi-user MIMO (MU-MIMO) is a set of advanced MIMO technologies where the available antenna elements are spread over multiple independent access points or radio terminals, each terminal with one or more antenna elements. To enhance communication capabilities of all terminals, MU-MIMO is provided with an extended version of space-division multiple access (SDMA) to allow multiple transmitters to send subspace-coded signals and multiple receivers to receive separate signals simultaneously in the same frequency.

In the '163 and '854 applications, distributed multi-user MIMO implementations include airborne and air-ground communications. Thus, relay nodes can include any combination of airborne and terrestrial communication platforms. In some aspects, multiple parallel paths are through multiple active bent-pipe transponding platforms. The MIMO channel transfer functions are based on available CSI, which can include the aggregate effects of propagating through one or more relay nodes, and spatial multiplexing (e.g., subspace precoding and/or decoding) weights provide for frequency reuse to enable multiple users to concurrently employ the same spectral resources in a RAN.

In some aspects, the network depicted in FIG. 1 can be configured to perform RAN mitigation. For example, upon detection of an unauthorized radio signal or determination that a remote-controlled vehicle (e.g., a UAV) may be a threat, one or more of the UEs may be identified as the radio controller of the vehicle. The UAVs may cooperatively process RAN signals to locate and identify either or both the UE(s) and the vehicle(s). In such cases, coordinated navigation among a cluster of UAVs can enable locating and/or identifying the UE. In this case, RAN mitigation can comprise cooperative navigation among the UAVs in which navigation is adapted according to the type of mitigation employed. The UAVs can cooperate to intercept the RAN signal transmitted by the controller and/or vehicle. Simply listening to the signal and measuring its characteristics (such as may be done for channel estimation) is sometimes called a passive attack. RAN mitigation can comprise active attacks during which coordinated navigation among UAVs in a cluster is performed to enable the attack. An active attack can comprise focused RAN jamming of a UE and/or its vehicle, and can be implemented using similar precoding techniques performed in cooperative MIMO. Other active attacks include protocol manipulation of the RAN signals employed by the target UE(s) and/or vehicles, such as to cause the radios to perform in a manner that is within its normal operating parameters, but is inappropriate for given conditions or the operator's intent. In some aspects, an active attack may comprise hijacking the vehicle electronically via its radio link, possibly exploiting vulnerabilities in its software, such as to land it in a safe location, direct it away from a restricted airspace, or activate its homing routine. In aspects of the disclosure, coordinated navigation is achieved via rule-based autonomous navigation control aboard each UAV, wherein the rules are based on relative spatial locations of other UAVs and may be adapted based on mission objectives. In some cases, the mission objectives are served by adapting the rules, and thus navigation, based on RAN measurements, which may establish RAN performance criteria. The implementation of such autonomous navigation can lead to swarm intelligence.

Swarm intelligence refers generally to the study of the collective behavior of multi-component systems that coordinate using decentralized controls and self-organization. From an engineering point of view, swarm intelligence emphasizes the bottom-up design of autonomous distributed systems that can provide adaptive, robust, and scalable behaviors.

As described above, a distributed MIMO communication system can comprise multiple BTSs with multiple antenna elements, a CP, and a plurality of remote receivers (e.g., UEs), wherein the multiple BTSs (and/or the CP) are configured to measure current channel status information (such as by sending training signals and receiving responses of the training signals from the remote receivers, receiving training signals from the remote receivers, performing channel estimation based on known characteristics of data signals received from the remote receivers, and/or other blind adaptive processing of signals received from the remote receivers), then updating the current CSI and updating configurations of the MIMO preprocessing. However, the multipath channel further comprises wireless communication electronic systems on multiple platforms configured to actively scatter wirelessly communications signals originated from the BTSs toward multiple remote receivers.

In mobile ad-hoc networks, particularly in networks that employ UAVs as relay nodes, the mobility of the network elements and (in some cases) the lack of central control can make cooperative-MIMO processing difficult. In these networks, it can be advantageous to provide cooperative-MIMO processing algorithms that are robust and adaptive and work in a decentralized and self-organizing manner.

Aspects of the disclosure comprise decision processing and control of the active scattering platforms 111.1-111.4, 112.1-112.3, and 113.1-113.3. Broadly considered, the field of cooperative decision and control covers those interdisciplinary methods that can be used for operating of semi-autonomous agents deployed to achieve a common objective. By exploiting the agents' capabilities, it is expected that the combined effort of the team can exceed the sum of its parts. Harnessing this potential benefit, however, is challenging due to the complexity that dealing with miscellaneous components in dynamic and uncertain environments brings about. In general, cooperative decision and control algorithms find application in the supervision of large networked systems, such as sensor and actuator monitoring networks, supply-chain management systems, the power grid, and traffic systems. A special and important use is the command and control of teams of UAVs, such as in surveillance and combat scenarios.

In some aspects of the disclosure, the active scattering platforms 111.1-111.4, 112.1-112.3, and 113.1-113.3 are UAVs, and command and control of the UAVs can provide for both flight management and cooperative-MIMO processing. In some aspects, cooperative flight management (such as the concept of "free flight" in air traffic control applications) employs many of the same local communication and situational awareness criteria that are useful for coordinating cooperative antennas for MIMO processing. While conventional distributed air traffic control techniques provide only navigation management (e.g., collision avoidance, maintaining safe aircraft spacing, optimal routing, etc.), aspects disclosed herein introduce MIMO processing criteria into the navigation decision-making process. In some aspects, the MIMO processing criteria may be developed locally (e.g., by the UAVs), remotely (e.g., by the CP, BTSs, UEs), or some combination thereof.

Some aspects exploit the fact that cooperative flight management employs many of the same local communication and situational awareness criteria that are useful for distributed synchronization. Such aspects enable a decentralized, feedback-based synchronization architecture in which each transmitter adapts its frequency and phase independently based on feedback from the receiver(s). In principle, this can allow the system to scale to an indefinitely large number of cooperating transmitters.

Various types of routing algorithms can be used. Table-driven algorithms are usually purely proactive: all nodes try to maintain routes to all other nodes at all times. This means that they need to keep track of all topology changes, which can be difficult if there are many nodes and/or if the nodes are very mobile. Demand-driven algorithms are purely reactive: nodes only gather routing information when a data session to a new destination starts, or when a route which is in use fails. Reactive algorithms are in general more scalable, since they reduce routing overhead, but they can suffer from oscillations in performance because they are usually not prepared for disruptive events. Routing algorithms employed in some aspects can be hybrid, using both proactive and reactive components.

In the UAV swarm, individual UAV nodes can have limited communication range, particularly for UAV-to-UAV communications. Data and control packets may need to be routed in a multi-hop modality. Data communications can be established between the nodes in the network in order to support different activities. For example, UAV-to-AUV communications can comprise data transfers and control signaling for Cooperative-MIMO processing. This can also include routing operations within the swarm and between clusters. Intermediate UAV sink nodes can individually or cooperatively process data before sending the results to a global sink and/or can locally trigger the appropriate actions. The global sink (which may be a UAV cluster head or the CP 130) performs full data aggregation, as well as global processing operations, such as MIMO subspace precoding and/or decoding.

In some aspects, the design and implementation of routing schemes that can support efficient information exchanges and processing tasks in a Cooperative-MIMO network can advantageously account for the following considerations. First, the mechanisms adopted for route discovery and information routing should be energy efficient. Second, the network should have autonomic properties, meaning that the protocols in use must be self-organizing and robust to failures and losses. Finally, the routing protocol should be able to handle large and dense networks, and the associated challenges resulting from the need to discover, maintain, and use potentially long multi-hop paths. Such criteria for efficient information exchanges can be implemented via adaptations to the navigation rules employed by the UAVs.

Figure 2:
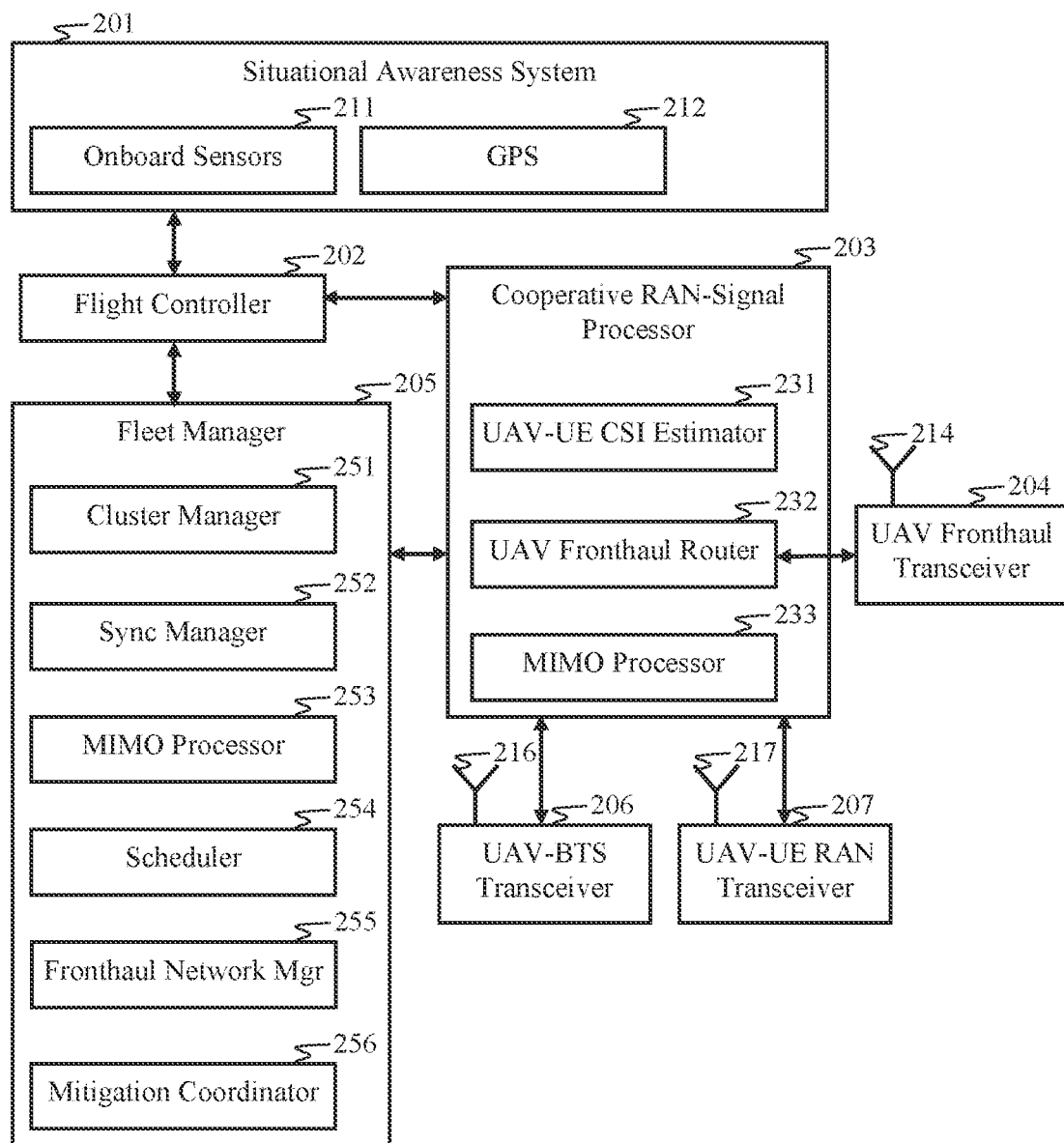
FIG. 2 is a block diagram of a UAV in accordance with certain aspects of the disclosure.

FIG. 2 is a block diagram of a UAV in accordance with certain aspects of the disclosure. A flight controller 202 is communicatively coupled to a situational awareness system 201 and a cooperative RAN-signal processor 203. A UAV fronthaul transceiver 204 can comprise a UAV fronthaul router 232. The system 201 can comprise at least one or more onboard sensors 211 and a GPS module 212. The processor 203 can comprise a UAV-UE CSI estimator 231, the UAV Fronthaul router 232, and optionally, a MIMO processor 233. The processor 203 is coupled to a UAV-BTS transceiver 206 and a UAV-UE transceiver 207. Optionally, a fleet manager 205 may be provided. The fleet manager 207 can comprise a UAV cluster manager 251, a synchronization manager 252, a MIMO processor 253, a scheduler 254, a fronthaul network manager 255, and/or a mitigation coordinator 256.

The system 201 is configured to determine the UAV's relative spatial location with respect to at least one other UAV. The relative spatial location can include, for example, geographic location information (e.g., longitude, latitude, etc.) and/or directional path characteristic information (e.g., distance, altitude, directional heading, airspeed, and/or attitude). The relative spatial locations of nearby UAVs and/or UAVs assigned to a particular cluster can be determined. Onboard sensors 211 can include active sensors, such as radar, lidar, acoustic ranging and detection system, as well as other active sensors, for determining the relative spatial location. Onboard sensors 211 can include passive sensors, such as cameras, any of the other types of imaging systems, radio receivers (including antenna-array receivers), and microphones, as well as other passive sensors. Optionally, a GPS device, such as GPS module 212, may be provided. In some aspects, the system 201 may receive geographic location information and/or directional path characteristic information from other UAVs via the UAV fronthaul transceiver 204. For example, GPS data and/or flight instrument data may be broadcast by UAVs over the UAV fronthaul network.

The flight controller 202 is an onboard system configured to facilitate coordinated flight operations of two or more UAVs operating in close proximity to each other. The flight controller 202 may use the relative spatial location information to adjust the UAV's directional path to maintain a safe area around itself. The disclosed systems and methods may be implemented, for example, in an autonomous manner such as to provide flight inputs to an aerial vehicle autopilot in order to make adjustment in real time to the aerial vehicle flight path, e.g., the flight inputs may be input in a manner that does not alter existing waypoints but rather alters the trajectory vector an aerial vehicle uses to obtain a waypoint.

The flight controller 202 performs tasks similar to those executed by a pilot in a manned aircraft. Robust control techniques configured to adapt to changes in dynamics of the platform and the flight environment are provided to enable autonomous flight. In some aspects, a flight plan is input to the flight controller 202. By way of example, the flight plan may be determined by a ground control station or a UAV cluster head. Other possibilities include distributed flight planning, such as flight-plan determination via a consensus of UAVs, ground stations, or some combination thereof. The flight controller 202 employs a rule-based flight coordination protocol (e.g., via computer processor/s or other type/s of suitable processing component/s on each of the UAVs) to provide effective de-confliction of flight paths on a real-time or near real-time basis.

In some aspects, the flight controller 202 can be configured to adapt the rules of the flight coordination protocol based on various environmental factors (which may be measured by corresponding sensors, such as meteorological instruments, as well as others) and/or mission objectives. Furthermore, flight controller 202 can be configured to jointly process flight telemetry data with RAN performance data to provide UAV mobility control that improves RAN communication performance. For example, flight controller 202 can adapt the UAV's flight path to provide speed, heading, altitude, attitude, and/or position with respect to nearby UAVs to enhance RAN connectivity with ground terminals, such as UEs. Changes to the UAV's flight path can be made to facilitate and/or enhance performance of cooperative RAN processing between UAVs in a cluster.

In another aspect, the UE is targeted for mitigation. For example, the UE may comprise a radio controller for a radio-controlled vehicle that is identified as a threat. The CSI estimator 231 or some other component of the cooperative RAN signal processor 203 can generate RAN performance criteria for one or more targets to be attacked (e.g., radio-controlled vehicles and/or their controller(s)). The RAN performance criteria can be employed as RAN mitigation criteria by the flight controller 202 to adapt the UAV's flight in a manner that facilitates the UAV's ability to perform radio countermeasures against the target(s). In some aspects, RAN performance criteria can be configured to comprise additional RAN mitigation criteria. In response to received RAN mitigation criteria, the flight controller 202 can adapt the UAV's flight to facilitate cooperative mitigation processing with other UAVs. For example, the flight controller 202 may be responsive to processor 203 in order to adapt flight navigation criteria according to the RAN performance criteria, which can provide for enhancing RAN mitigation performance. The navigation criteria can be implemented by the flight controller 202 as the rule base for autonomous navigation control. A selection or adaptation of the flight navigation criteria might be limited by prescribed navigation criteria boundaries, such as min/max altitude, min/max airspeed, min/max aircraft separation, airspace restrictions, and the like. The flight controller 202 might store the navigation criteria and the navigation criteria boundaries in a memory. Then the flight controller 202 may employ the navigation criteria as an operating range of navigational parameters and/or target navigational parameter(s) (e.g., aircraft separation, altitude, attitude, aircraft separation, and the like) to control the UAV's flight. In some aspects, flight controller 202 may communicate with other UAVs and adapt its navigation criteria as a coordinated and/or responsive process to achieve a RAN performance objective.

In some aspects, RAN performance criteria that would be employed herein for the purpose of enhancing RAN performance can also be used to mitigate a RAN link (e.g., conduct active and/or passive attacks on the RAN transceivers using the link). In such aspects, RAN mitigation criteria can comprise RAN performance criteria. By way of example, mitigation is a tactical response to a threat and can comprise directing a radio transmission signal at the target, such as to impair, manipulate, and/or hijack the target's RAN link while reducing or avoiding collateral RF damage (e.g., impairing the operation of other communication systems).

In one aspect, processor 203 comprises RAN channel estimator 231 configured to measure and/or characterize at least one RAN channel between UAVs and at least one UE. For example, CSI, received signal strength, bit error rate, transmission control messages, error detection, error control messages, and the like can be used to characterize RAN link performance. Alternatively, RAN channel estimator 231 receives CSI and/or other RAN link performance measurements transmitted by UEs.

The UAV fronthaul transceiver 204 can comprise router 232. In one aspect, the router 232 is part of the processor 203. However, the router 232 may be separate, configured as part of transceiver 204, or otherwise disposed within the UAV system. In one aspect, router 232 provides multi-hop capabilities for relaying signals between the RAN and the BTSs. Signals from transceivers 206 or 207 may be routed via router 232 to another UAV via transceiver 204. In some aspects, router 232 may communicate channel estimates from module 231, onboard sensor 211 measurements, GPS 212 data, ground station control messages, fronthaul network control messages, and/or fleet manager 205 control messages to other UAVs via the fronthaul network.

In some aspects, MIMO processor 233 employs the router 232 to distribute RAN signals to be jointly processed and (optionally) MIMO control messages to other UAVs. MIMO processor 233 can coordinate the UAVs in a cluster to perform cooperative processing of RAN baseband signals.

In conventional MIMO, the RAN transceiver's 207 antenna system 217 comprises an antenna array, which provides all the MIMO gain. But the lack of rich scattering in the UAS environment limits spatial multiplexing gain. While some spatial multiplexing gain may be attainable, even in line-of-sight (LoS) channels, by carefully designing the antenna separation with respect to carrier wavelength and link distance (e.g., F. Bohagen, et al., "Design of optimal high-rank line-of-sight MIMO channels," IEEE Trans. Wireless Commun., vol. 6, no. 4, pp. 1420-1425, April 2007), this requires large antenna separation, high carrier frequency, and short communication range. Another approach involves implementing multi-user MIMO by simultaneously serving sufficiently separated ground terminals with angular separations exceeding the angular resolution of the antenna array installed on the UAV.

By enabling cooperation between UAVs, cooperative-MIMO processing synthesizes extremely large antenna arrays with large antenna separation. This dramatically increases spatial reuse and enhances RAN performance while enabling lower carrier frequencies and longer communication range. The characteristics of the UAV-MIMO channel influence the performance of the UAV-MIMO data link. Therefore, in aspects of the disclosure, the positioning of UAVs in a Cooperative-MIMO UAV cluster can be adapted by each flight controller 202 to enhance advantageous characteristics of the UAV-MIMO channel to improve RAN performance.

The navigation criteria employed by the flight controller 202 can be adapted by processor 203 (such as via MIMO processor 233) within preset navigation criteria boundaries. For example, RAN performance measurements (such as from estimator 231 and/or an estimator on at least one other UAV) can be employed in a decision-making process to update the navigation criteria and instruct the flight controller to adapt the UAV's flight path to enhance RAN performance, such as performance achievable via MIMO subspace processing.

In some aspects, centralized control of a UAV cluster can be implemented via fleet manager 202. A UAV functioning as a UAV cluster head can comprise the fleet manager 202, which can provide cluster management, including (but not limited to) one or more of assigning UAVs to operate in a cluster, assigning operations to the UAVs, scheduling resources to be used by the UAVs, synchronizing the UAVs in a cluster, performing synchronization with other clusters, providing navigation control messages to the UAVs, providing for fronthaul network management of the cluster's network, coordinating UAVs to perform mitigations, and coordinating the UAVs to perform cooperative-MIMO processing of the RAN signals, which can include performing central processing of RAN signals received by and/or transmitted by the UAVs in the cluster. MIMO processor 253 may communicate with each UAV's local MIMO processor 233. In one example, MIMO processor 253 directly or indirectly instructs each UAV's flight controller 202 to adapt its flight according to enhance RAN performance. By way of example, the MIMO processor 253 may update the navigation criteria employed by each UAV's flight controller 202.

In some aspects, distributed control of a UAV cluster is employed. Flight adaptations may be negotiated by flight controllers 202 on the different UAVs in a cluster. In some aspects, feedback mechanisms may be employed between UAV flight controllers 202 and these feedback mechanisms may include rules to avoid oscillations and/or to quickly converge to an optimal cluster configuration. In certain aspects, UAVs in a cluster may adapt their flight paths in a manner that induces UAVs not in the cluster to adapt their flight paths in a predictable manner. In one example, UAVs in a cluster employ an iterative process to induce other UAVs to move, such as to clear a space for a predetermined cluster configuration to occupy. In certain aspects, UAVs may transmit their intents to other (e.g., nearby) UAVs so those UAVs can more efficiently adapt their flight paths. UAVs may be provided with different levels of priority, and those with higher priority may move UAVs with lower priority out of the way. Priority levels may be determined by a cluster's mission, a UAVs function in the cluster, each UAV's RAN performance measurement, maneuverability, processing capability, battery life, and/or other criteria.

The fleet manager 205 can comprise a system aboard the UAV and/or it can be implemented via one or more remote systems communicatively coupled to the UAV. The fleet manager 205 can be implemented as a central or distributed system. Any of the components 251-256 can be implemented via centralized or distributed means. In one aspect, the fleet manager 205 resides on the cluster head of a UAV cluster. In another aspect, fleet manager 205 resides in one or more ground stations. In another aspect, fleet manager 205 resides on each UAV but may comprise different functionality depending on the UAV on which it resides.

In some aspects, fleet manager 205 is implemented on a combination of devices, including UAVs and ground stations. For example, MIMO processor 253 may be implemented on each UAV in a cluster (such as for local MIMO processing), and MIMO processor 253 may be implemented in a data center coupled to the BTSs (such as for global MIMO processing). Cluster manager 251 may reside on the cluster head and may create and adapt UAV clusters based on various factors, such as (but not limited to) proximity of UAVs, UAV capabilities, RAN demand topologies, UAV network topologies, geographical locations of UAVs, UAV battery life, channel measurements (fronthaul and/or RAN), etc. In some aspects, cluster management may be performed or supplemented by ground control stations.

Sync manager 252 may reside on a cluster head and/or one or more UAVs in a cluster configured to help synchronize signal processing and communications. In some aspects, synchronization may comprise ground-based synchronization and/or GPS-based synchronization. Sync manager 252 can synchronize UAV clocks and provide for synchronous RAN transmissions and provide a timing reference for UAV fronthaul communications. Sync manager 252 may be configured for various calibration functions, such as to compensate for phase drift, frequency offsets, and timing offsets. In one aspect, sync manager 252 helps to calibrate local oscillators onboard the UAVs.

Scheduler 254 can comprise different types of scheduling functions. For example, RAN resource scheduling may be performed by ground stations, such as to assign RAN resources to each UE. In some aspects, scheduler 254 residing on a cluster head schedules which UAVs serve each UE. In some aspects, an SDR resides in the ground stations, such as in a data center coupled to the BTSs. The SDR spawns an SDR instance configured to serve each UE. In some aspects, the SDR instance selects the BTS antennas to serve its UE. The SDR instance may select which UAVs and/or UAV antennas to serve the UE, or the SDR may allow the cluster head to select the UAVs and/or UAV antennas. In some aspects, at least some details of how the RAN link is implemented are hidden from the SDR. In some aspects, scheduler 254 residing on one or more UAVs selects which UAVs in a cluster are active RAN transceivers. Scheduler 254 can determine which UAVs process RAN signals, such as calculating MIMO weights. Scheduler 254 may assign different signal processing tasks to the UAVs based on any of various criteria, including battery life, processing capability, storage capacity, among others.

Fronthaul network manager 255 can reside on one or more UAVs in a cluster and can be configured to provide for routing topologies, storage topologies, and/or processing topologies in the cluster. Manager 255 can provide routing tables for router 232. Manager 255 may be responsive to UAV fronthaul link quality to instruct the flight controller 202 onboard any of the UAVs to adapt flight path(s) to enhance or ensure UAV fronthaul communications, which can include inter-cluster and/or intra-cluster communications.

Mitigation coordinator 256 can reside on one or more UAVs in a cluster and can be configured to provide for mitigating a threat, such as by coordinating an attack on a RAN communication link employed by a target UE. For example, mitigation coordinator 256 can direct one or more other UAVs (such as UAVs in a cluster) to manipulate a RAN transmission protocol used by a targeted controller device to remotely control a vehicle, and/or a RAN transmission protocol used by the controller device to receive telemetry, video feeds, and the like from the vehicle. Mitigation of the RAN link can comprise employing MIMO processor 253, for example, to disrupt the RAN link, preferably in a manner that avoids disrupting other communication links. Mitigation can comprise eavesdropping on the target's RAN link, employing countermeasures designed to hijack control of the RAN link, and/or exploiting software vulnerabilities to acquire control of the vehicle. Mitigation coordinator 256 may operate, for example, with CSI estimator 231, radars, and/or other systems to provide geolocation and tracking of the controller device and/or vehicle(s) and may communicate this information to other systems that may provide for neutralizing the threat. In one aspect, mitigation coordinator 256 is responsive to the target's communications and/or movement for determining the effectiveness of prescribed mitigations. Coordinator 256 may operate with the scheduler 254 to schedule adaptations to mitigations performed by the UAVs, such as based on their determined effectiveness and/or feature characterization of the RAN protocol employed by the target.

FIG. 3A is a flow diagram that illustrates a method according to an aspect of the disclosure. The use of maneuverable UAVs for RAN terminals offers new opportunities for performance enhancement through the dynamic adjustment of UAV clusters to best suit the communication environment. Cooperative communications can be jointly designed with UAV mobility control to further improve the communication performance. A UAV is provided with spatial location information of nearby UAVs 301. The UAV performs cooperative RAN processing with at least one other UAV 302 in a UAV cluster. Inter-UAV communications are provided 303 to enable cooperative RAN processing. Autonomous UAV navigation (e.g., flight control) is based on the spatial location information and navigation criteria, which is determined, in part, by RAN performance criteria 304.

Figure 4:
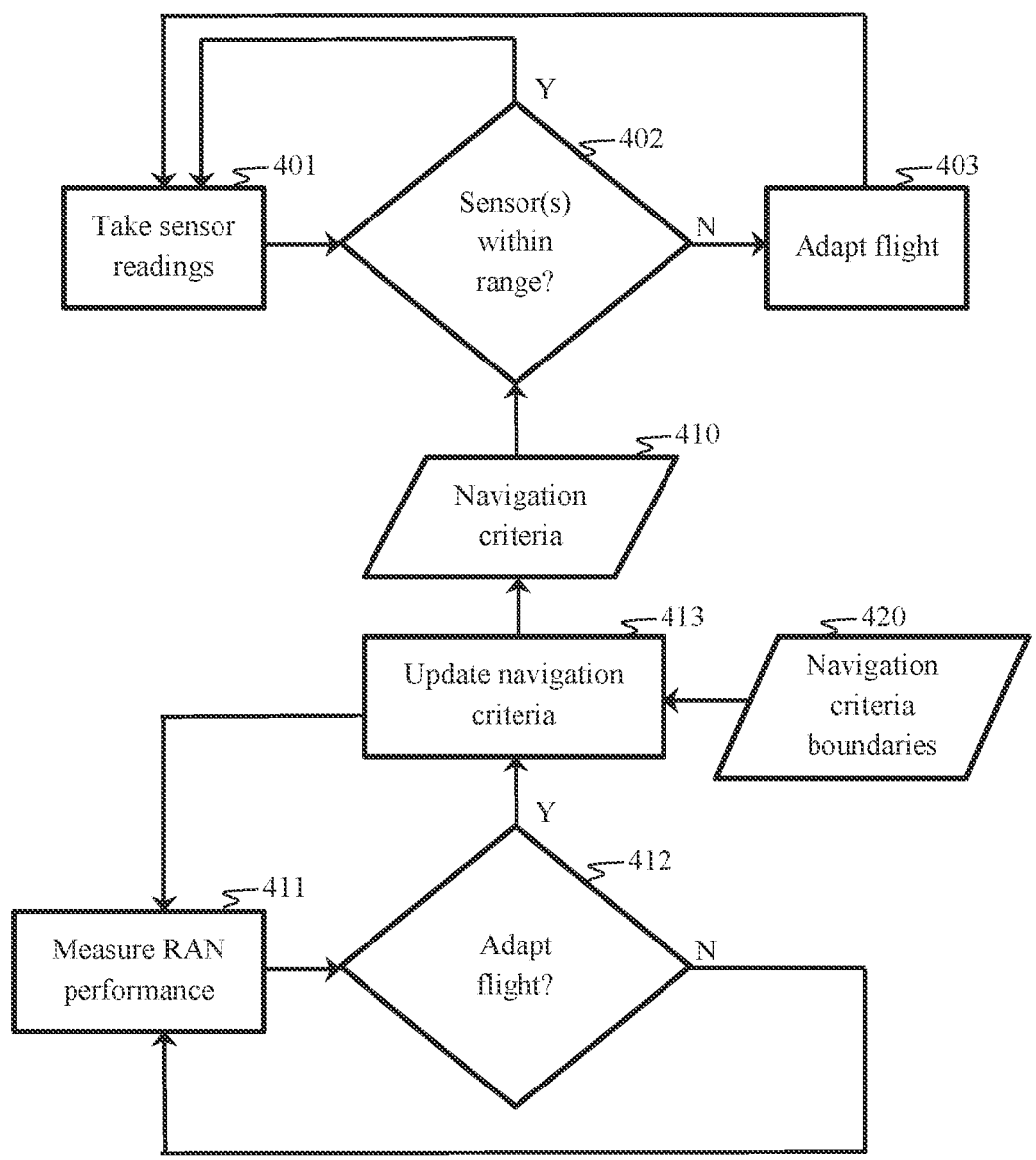
FIG. 4 illustrates a procedure that can be implemented by a computer processor configured to operate according to aspects of the disclosure.

FIG. 4 illustrates a procedure that employs steps 301 and 304. In some aspects, the procedure is implemented by a computer processor according to instructions of a software program configured to operate on input physical measurements described herein. A UAV takes sensor readings 401 at regular intervals to determine a relative spatial location with respect to at least one nearby UAV. In some aspects, the sensor readings comprise GPS coordinates. In one aspect, GPS coordinates derived by GPS receivers on other UAVs are conveyed via a fronthaul network to provide the sensor readings in step 401. The sensor readings are compared 402 with navigation criteria 410. If the sensor data indicates a navigation parameter (e.g., separation between UAVs, relative speed, variation in heading, variation in altitude, etc.) outside a predetermined range (e.g., navigation criteria), the UAV's flight path is adapted 403 by its flight controller 202, and then sensor readings are monitored 401 in a following time interval. Otherwise, the flight controller 202 or situational awareness system 201 continues to monitor the sensor readings 401.

Systems and methods may be employed to communicate the location information between two or more UAVs or other entities, and may be used to facilitate coordinated operations of two or more such entities. In one example, a UAV is made aware of one or more location (e.g., longitude, latitude, etc.) and/or flight characteristics (e.g., altitude, directional heading, airspeed, attitude, etc.) of one or more other adjacent aerial vehicles, and the UAV may use that location information to adjust its flight path to maintain a safe sphere of empty airspace around itself. The disclosed systems and methods may be implemented without need for a ground system and/or human controller to micro-manage the UAVs. Each of the aerial vehicles may be made aware of other aerial vehicles in its immediate airspace and, when appropriate, take evasive action to avoid collision. A rule-based flight coordination protocol may be implemented (e.g., by computer processor/s or other type/s of suitable processing component/s on each of the UAVs) to provide effective de-confliction of flight paths on a real-time or near real-time basis. Such a rule-based flight coordination protocol may be consistent and simple.

RAN performance measurements may be monitored concurrently 411 with sensor monitoring 401. RAN performance measurements may be produced by the estimator 231. The RAN performance is evaluated to determine if the flight path should be adapted to improve RAN performance 412. This may be performed by the flight controller 202 or processor 203. In one aspect, the navigation criteria 410 can be updated 413 within predetermined navigation criteria boundaries 420. Such boundaries can be designed to ensure safe distances between UAVs, and can be selected based on UAV maneuvering capabilities, number of UAVs in a cluster, cluster density, weather conditions, as well as other factors. The boundaries may be imposed by various regulations, including (but not limited to) restricted airspaces, altitude regulations, and airspeed restrictions. The boundaries and/or navigation criteria may be selected based on additional criteria, such as UAV-to-UAV fronthaul communication range, fronthaul network topology, optimizing UAV power efficiency, as well as other factors and/or objectives. The boundaries might be determined based on operating objectives of the UAV, such as delivering goods to a specific location, performing surveillance, or performing other mission that might require a preset flight plan that permits a limited amount of variations thereto. Updating the navigation criteria 410 may result in step 402 triggering the flight controller 202 to adapt the flight path 403, since the navigation criteria 410 can be implemented as the rule base for autonomous navigation control.

In one aspect, the UAV flight system comprises motors and propellers with control provided by an onboard flight controller/stabilization board (e.g., flight controller 202) selectively throttling the motors in response to control signals to adapt the flight path 403. One type of UAV is the multirotor or multicopter. This UAV is a rotorcraft with more than two rotors, and multicopters often use fixed-pitch blades with control of vehicle motion being provided by varying the speed of each rotor to change the thrust and torque. Flight path adaptation 403 can include adapting the UAV's attitude. Control systems for a vehicle's orientation (attitude) include actuators, which exert forces in various directions and generate rotational forces or moments about the aerodynamic center of the aircraft, and thus rotate the aircraft in pitch, roll, or yaw.

In one aspect, step 412 comprises quantifying MIMO channel quality from measurements received from step 411. The condition number of the MIMO channel matrix H is defined as the ratio of the maximum and minimum characteristic values of channel matrix H. In the MIMO system, as the condition number approaches one, the quality of the parallel spatial channels increases. When the ratio becomes larger, the MIMO channel quality diminishes. Based on the calculation method of UAV-MIMO normalized channel correlation matrix, processor 203 can analyze the characteristics of the UAV-MIMO channel.

The flight control problem in step 412 for UAV deployment can involve finding the optimal UAV separations, hovering altitude, and geographical location to enhance coverage in addition to RAN performance. But there are trade-offs. When the separation between antenna elements increases, the condition number of the channel matrix decreases, which improves the MIMO channel quality. However, the maximum separation between neighboring UAVs may be restricted based on navigation criteria boundaries and/or other factors, such as UAV fronthaul considerations, (e.g., frequency reuse objectives and maximum effective range). At larger separations, there can be diminishing benefits. Thus, updating the navigation criteria 413 can employ a cost-benefit trade-off between multiple factors.

Increasing the distance between UEs also decreases the condition number, which can improve the RAN MIMO channel. Thus, UAV cluster configuration can include scheduling, such as scheduling which UEs share RAN resource blocks in order to enhance frequency reuse.

Besides the antenna separation, the azimuth angle and pitching angle also influence the average channel capacity. For example, a smaller pitching angle can provide larger average channel capacity. Also, the UAV antenna might be oriented horizontally to provide a larger channel capacity.

For a particular environment, there might exist an optimal UAV altitude for coverage maximization, which is due to the following tradeoff: While increasing UAV altitude will lead to higher free space path loss, it also increases the possibility of having LoS links with the ground terminals. However, higher UAV altitudes lead to higher condition numbers, which inhibits MIMO performance.

The average MIMO channel capacity is smaller when UAVs are more distant from the UEs. This is because the greater geographical distance reduces the spatial resolution, and is also related to reduced multipath.

The characteristics of the UAV-UE channel influence the performance of UAV-based cooperative MIMO to a great extent; therefore, the positioning of UAVs in a Cooperative-MIMO cluster can be adapted to enhance advantageous characteristics of the cooperative-MIMO channel to improve performance. In some aspects of the disclosure, UAV flight paths are determined not only by interactions with each other (such as to provide course adjustments, aircraft spacing, etc.), but also by measured and/or calculated parameters in a multi-dimensional search space corresponding to radio communications with a set of UEs. In a population-based search algorithm, optimization can comprise minimizing a cost function or maximizing a benefit. In some aspects of the disclosure, optimization comprises determining UAV locations (including flight patterns) that reduce cost functions and/or increase benefits, but within constraints governed by avionic systems (e.g., max/min speed, altitude, maneuverability, etc.), air traffic control (e.g., situational awareness, minimum required aircraft spacing, optimal spacing, max/min altitude, predetermined flight paths, intended destination, etc.), and optionally, environmental factors (e.g., weather, terrain, buildings, etc.).

Particle swarm optimization (PSO) is a population-based search procedure in which individuals (particles) change their position in a multi-dimensional search space with time. In PSO, the multidimensional search space comprises a set of potential solutions. During "flight" in the search space, each particle adjusts its position on the basis of its own experience and on the basis of the neighboring particles' experience, making use of the best position encountered by itself and its neighbors. Thus, a PSO system combines local search methods with global search methods. Therefore each particle has a tendency to move in a direction of sequentially improving solutions In accordance with some aspects of the disclosure, each PSO particle comprises a UAV. In some aspects, a particle may comprise a group of UAVs, and in some aspects, the selection of UAVs in such a group can change. The UAVs physically move (i.e., fly) in actual three-dimensional space, and their flight paths are determined not only by interactions with each other (such as to provide course adjustments, aircraft spacing, etc.), but also by measured and/or calculated parameters in a multi-dimensional search space corresponding to radio communications with a set of UEs.

In a population-based search algorithm, optimization can comprise minimizing a cost function or maximizing a benefit. In some aspects of the disclosure, optimization comprises determining UAV locations (including flight patterns) that reduce cost functions and/or increase benefits, but within constraints governed by avionic systems (e.g., max/min speed, altitude, maneuverability, etc.), air traffic control (e.g., situational awareness, minimum required aircraft spacing, optimal spacing, max/min altitude, predetermined flight paths, intended destination, etc.), and optionally, environmental factors (e.g., weather, terrain, buildings, etc.).

In Cooperative-MIMO communications, the channels conditions can vary in time rapidly and the communication system may need to change its selection of the antennas frequently in order to maintain high performance. Computational efficiency of the antenna selection algorithm is important for adapting the antennas selection quickly to changing channel conditions. Due to the high computational complexity of the optimal selection, a suboptimal solution with lower complexity can be advantageous.

FIG. 3B is a flow diagram that illustrates a method according to some aspects of the disclosure. In step 304, autonomous UAV navigation can employ a rule base configured in accordance with energy-efficient operation parameters. Step 305 provides for processing RAN signals in the UAV-UE link, such as to provide RAN performance enhancement.

Energy-efficient operation aims to reduce unnecessary energy consumption by the UAVs. As the primary energy usage of UAVs supports aircraft propulsion and wireless communications, energy-efficient operation schemes can be classified into two categories. The first one is energy-efficient mobility, for which the movement of the UAVs should be carefully controlled by taking into account the energy consumption associated with every maneuver. Energy-efficient mobility schemes can be designed with path planning optimization by using appropriate energy consumption models as a function of UAV speed, acceleration, altitude, etc. Such models can provide a basis for adapting either or both the navigation criteria and the navigation criteria boundaries.

The other category of energy-efficient operation is energy-efficient communication, for which the communication requirement is satisfied with reduced energy expenditure on communication-related functions, such as computer processors, amplifiers, etc. To this end, one common approach is to optimize the communication strategies to maximize energy efficiency in bits/Joule (e.g., the number of successfully communicated data bits per unit energy consumption). Such an approach can be used to adapt the navigation criteria.

FIG. 3C is a flow diagram that illustrates a method according to some aspects of the disclosure in which a step 306 is provided to mitigate at least one UE's RAN link. In this case, step 302 can comprise identifying a UE transmission, measuring the UE channel characteristics, and/or processing the received UE transmission to identify the signal type, radio transmitter type, and/or remote-controlled vehicle type. The UE channel characteristics, which may comprise channel characteristics between the UAV(s) and the vehicle the UE is controlling, can be used to adapt navigation criteria 304 and/or provide for mitigation 305, such as to track the vehicle and/or efficiently direct transmitted countermeasures. Adaptation of the navigation criteria 304 can result in flight adaptations designed to enhance RAN mitigation performance. By way of example, but without limitation, the navigation criteria can be adapted 304 to enhance cooperative RAN mitigation performance of a group (e.g., cluster) of UAVs assigned to cooperatively mitigate a target. In some aspects, the signal type, radio transmitter type, and/or remote-controlled vehicle type can be used to formulate a mitigation 305 plan for the UAV and/or the group.

Figure 5:
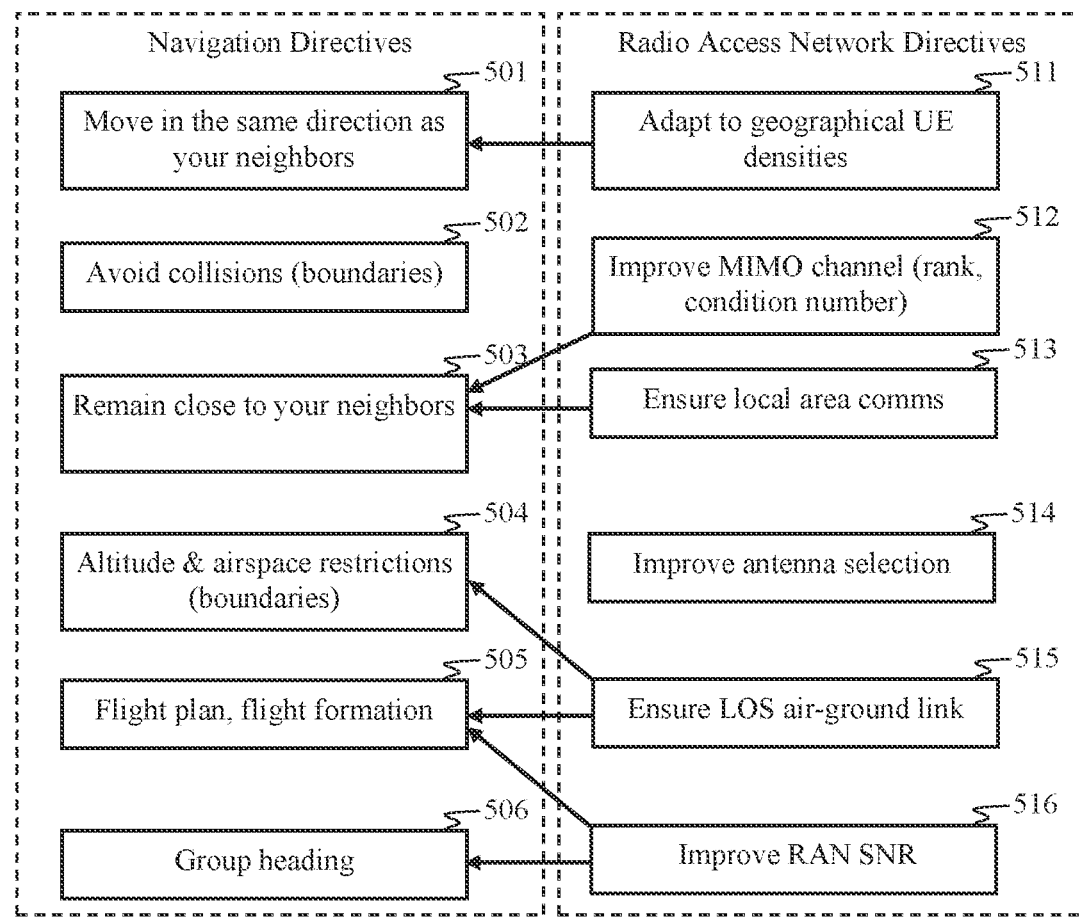
FIG. 5 illustrates relationships between navigational directives and RAN directives associated with managing a swarm of UAVs in accordance with aspects of the disclosure.

FIG. 5 illustrates relationships between navigational directives and RAN directives associated with managing a swarm of UAVs in accordance with aspects of the disclosure. At least some of the RAN directives can be configured to adapt at least some of the navigational directives. The navigational directives include individual directives 501-506, and the RAN directives comprise individual directives 511-516.

The directives 501-506 may comprise simple rules, such as move in the same direction as your neighbors 501, avoid collisions 502, remain close to your neighbors 503, abide by altitude and airspace restrictions 504, maintain a particular flight formation relative to your neighbors 505, and at least one of the members of the swarm has information about the group heading 506, such as an intended destination or a flight plan with specific way points.

The directives 501-506 may comprise navigation criteria based on sensor measurements, such as a threshold value or a range of permissible values. For example, avoid collisions 502 might establish minimum aircraft separation. In some cases, such as in the case of directive 502, the navigation criteria might comprise a boundary which cannot be changed by a RAN directive. However, other factors (such as weather conditions) might affect the boundary. In other cases, a navigation directive, such as directive 503 (remain close to your neighbor), can have its threshold or range adapted by a RAN directive, possibly within predetermined boundaries.

The directives 511-516 may also comprise simple rules based on local data collection, local processing, and/or remote processing. In some aspects, the RAN directives 511-516 influence the UAV navigation within the bounds of the rules (e.g., 501-506). In some aspects, RAN directives may change one or more of the navigation rules 501-506.

Adaptation to geographical UE densities 511 can comprise selecting the heading of one or more UAVs, such as to form a cluster of UAVs or to direct at least one existing cluster in a swarm to service UEs in a particular geographical location. The heading selection can be performed in response to UAVs indirectly detecting UE densities, such as via RAN channel activity. Similarly, BTSs and/or CPs can instruct the UAVs to change their headings in order to adapt to detected UE densities. In one aspect, the RAN adapts the selection of antennas employed on either side of a MIMO channel, such as to increase the MIMO channel rank, improve diversity, balance power loads across multiple devices, and/or distribute processing loads across devices. By way of example, when the number of UEs in a particular geographical area exceeds the number of server-side antennas configured to serve the UEs (e.g., the total of available base transceiver antennas and UAV antennas provisioned to serve a set of UEs), the UEs, the BTSs, the CP, and/or the UAVs may call for additional UAVs to support cooperative-MIMO processing in the RAN. Furthermore, it should be appreciated that UEs can be provisioned to support server-side operations, such as increasing the rank of the MIMO channel matrix, relaying signals, and providing computational resources.

In some aspects, conditions for navigational directives can be adapted relative to one or more RAN directives. For example, rules 501 and 503 may be implemented via an algorithm that weighs certain advantages, such as power savings from flying in a group formation with other UAVs (which reduces drag), against disadvantages of not following the most direct course to a predetermined location. The algorithm might choose a path that allows the UAV(s) to fly with a particular group until a certain point at which a new course is selected and the UAV(s) break away from the group. In some aspects, different groups in a swarm negotiate a course for the swarm based on the needs of the groups or individual UAVs. A least squares type of method or other regression analysis method could be used to plot a course for the swarm that optimizes at least one parameter (such as a function of power savings and expediency) that characterizes how well-served the UAVs are.

Some conditions, such as the criteria of rule 501, might be bent slightly under the influence of RAN directives. For example, a UAV can move generally in the same direction as its neighbors while employing a small degree of divergent movement, such as to change its location within the swarm or to vary its course, such as in accordance with perturbation techniques disclosed below.

In some aspects, navigation directives and RAN directives can be the same. For example, the rule "remain close to your neighbors" 503 can be harmonious with the rule "ensure local area communications" 513, since one aspect of maintaining communications between UAVs includes staying within a specified range. In another aspect, a swarm might comprise multiple clusters, and UAVs within a cluster might need to be spatially separated by a sufficient distance such as to achieve sufficient channel rank or reduce the condition number 512, synthesize a sufficiently large aperture (not shown), or any other number of reasons. However, the navigation rule 503 can still be maintained with respect to UAVs that belong to other groups. Thus, as demonstrated here, RAN directives can adapt one or more of the navigation directives. In some case, conflicting RAN directives can be resolved by determining compromise RAN criteria, such as may be based on a cost-benefit optimization. Thus, one RAN directive might affect conditions specified by another RAN directive.

While the navigation directives tend to correspond to decentralized operations, some of these directives can be provided by a centralized control operation, such as a flight plan 505 (in some aspects, the flight plan 505 comprises only a destination) and group heading 506. For example, the flight plan 505 might be determined by the CP 130 (e.g., the CP 130 being responsive to UE requests for service, selecting UAVs, and directing them to serve the UEs). The group heading 506 might be determined by a central controller within a UAV cluster (e.g., a cluster head).

In accordance with certain aspects, there is a hierarchy with respect to control directives. In one aspect, control directives from a remote centralized authority can be overridden by control directives from a local authority. For example, with respect to operations performed by a particular UAV, a CP might be overridden by a UAV cluster head or by the particular UAV. Some directives, such as avoid collisions 502 takes precedence over other directives, such as flight plan 505. Such overriding control directives may be temporary, and adherence to control directives issued by the central authority may resume thereafter. In another aspect, a centralized authority (e.g., the CP 130) can override certain control directives from a local authority, such as a UAV cluster head. In some aspects, a central authority (e.g., the CP 130 and/or a UAV cluster head) can override a UAV's individual directives.

In one aspect, each of a set of UAVs performs local MIMO processing operations, and then the results of the local MIMO processing are communicated to a central authority, which performs global MIMO processing with the results. By way of example, a cluster of UAVs may perform local cooperative-MIMO processing, such as to determine subspace processing weights from local CSI. The local MIMO processing results (e.g., local subspace weights and, optionally, the CSI) can be communicated to a central authority which receives local MIMO processing results from other clusters. Upon collecting local MIMO processing results from multiple clusters, the central authority can perform global MIMO processing with the results.

In some aspects of the disclosure, the local results may constitute a first estimate for the MIMO processing weights, and global processing might provide improved estimates, which can then be used to perform spatial multiplexing and/or demultiplexing. In some aspects, global MIMO processing can constitute evaluating multiple local MIMO processing results followed by the central authority instructing the clusters to provide a particular perturbation or predetermined adaptation to their weights.

It should be appreciated that aforementioned local and global processing may be performed on different scales. By way of example, local processing may comprise a wireless network node's processing of its own antenna array signals, in which case global processing could comprise cooperative processing of multiple nodes' signals, such as by a cluster head. Local processing may comprise a cluster of such nodes performing cooperative processing, in which case global processing could comprise processing signals from multiple clusters, such as by a super-cluster head or by the CP 130. Local processing could comprise processing signals received from multiple clusters, such as in the CP 130, in which case global processing could comprise processing signals between multiple CPs. Thus, global processing can help mitigate interference between nodes, between clusters, and/or between CPs, depending on the scale. It should also be appreciated that a processing hierarchy may provide for one or more levels of processing between local and global processing.

In one aspect of the disclosure, a gradient technique can be employed to adapt a cluster's heading in order to better serve a group of UEs. In one example, each UAV in a cluster measures a transmission from a UE set comprising one or more UEs. A measurement may comprise signal power, SNR, channel measurements, or the like. The measurements are then processed with the flight formation of the cluster. If measurements from UAVs at one side of the flight formation are superior to measurements from UAVs on at least one other side, then an algorithm can be employed (e.g., by the cluster head) to map a new heading vector for the cluster in the direction of the measurement gradient.

Another aspect of the disclosure employs gradient type of routing in a distributed network as a means for delivering network services and may be used for configuring the network to adapt to changing network loads. For example, nodes in a network (e.g., UAVs) can share quality measurements with each other. Since the local area links employed by UAVs to communicate with each other can be short range, ultra-high bandwidth links (e.g., UWB, optical wireless, etc.), bandwidth overhead is generally not a problem. These quality measurements may comprise measured power of a UE's transmission, SNR, CSI, etc. These quality measurements may comprise calculations based on the aforementioned measurements, and may comprise eigenvalues, channel correlation, various subspace channel quality indicators, etc. Data intended for a particular UE or set of UEs may be routed through the network wherein the routing path is determined by successively improving quality measurements. Thus, the routing path may follow a sequence of nodes having successively increasing quality measurements. The data follows the quality measurement gradient until a predetermined quality measurement condition is met, such as a threshold quality measurement value, a maximum (local or absolute) value, etc., at which point it has found its gradient routing destination relay node. The data may be transmitted to the UE(s) from that node via RAN transmission, or it may be distributed to at least one other node (such as nodes in a cooperative-MIMO cluster) before being transmitted in the RAN.

In one aspect of gradient routing, routing information may be established on demand, but instead of a cost for delivering a message, messages are passed among nodes with successively better RAN connectivity to the destination UE. For example, in a first case, each node has a quality measurement table that stores quality measurements of its neighbors. If upon receiving the message, the node determines that one of its neighbors has a better quality measurement, it routes the message to its neighbor. In a second case, each node only knows its own quality measurements (unless perhaps those measurements are pertinent to cooperative-MIMO processing in a cluster to which the node belongs). A node listens to a broadcast from its neighbor comprising a message and indicating the neighbor's quality measurement corresponding to the message's destination UE. Sometimes multiple broadcasts may occur simultaneously with the same message, in which case the node pays attention only to the broadcast with the highest quality measurement. If the node has a better quality measurement than indicated in the received broadcast, then it rebroadcasts the message along with its quality measurement, and then it listens for any broadcast that indicates the message was rebroadcast by a subsequent node with a better quality measurement. While flooding results in a high data bandwidth overhead, the use of extremely high bandwidth local-area links (such as optical, UWB, etc.) minimizes this. However, in some aspects, techniques may be employed for removing duplicate broadcast messages. In a third case, each node only knows its own quality measurements, as in the second case. However, when a node has a message to send, it polls its neighbors for their corresponding quality measurements specific to the destination UE. Then the node routes the message to the neighbor with the best quality measurement.

In one aspect of the disclosure, a method of gradient routing comprises data to be transmitted to a particular UE being routed over a fronthaul network from a CP to at least one base transceiver terminal. The at least one base transceiver terminal transmits the data to at least one of a set of relay nodes, such as UAVs. The data is routed through the relay nodes using a gradient routing algorithm based on quality measurements corresponding to its destination UE. Once the data is delivered to its destination relay node, it is either transmitted to its destination UE, or it may be distributed to other relay nodes configured to cooperatively transmit signals to the destination UE.

Figure 6:
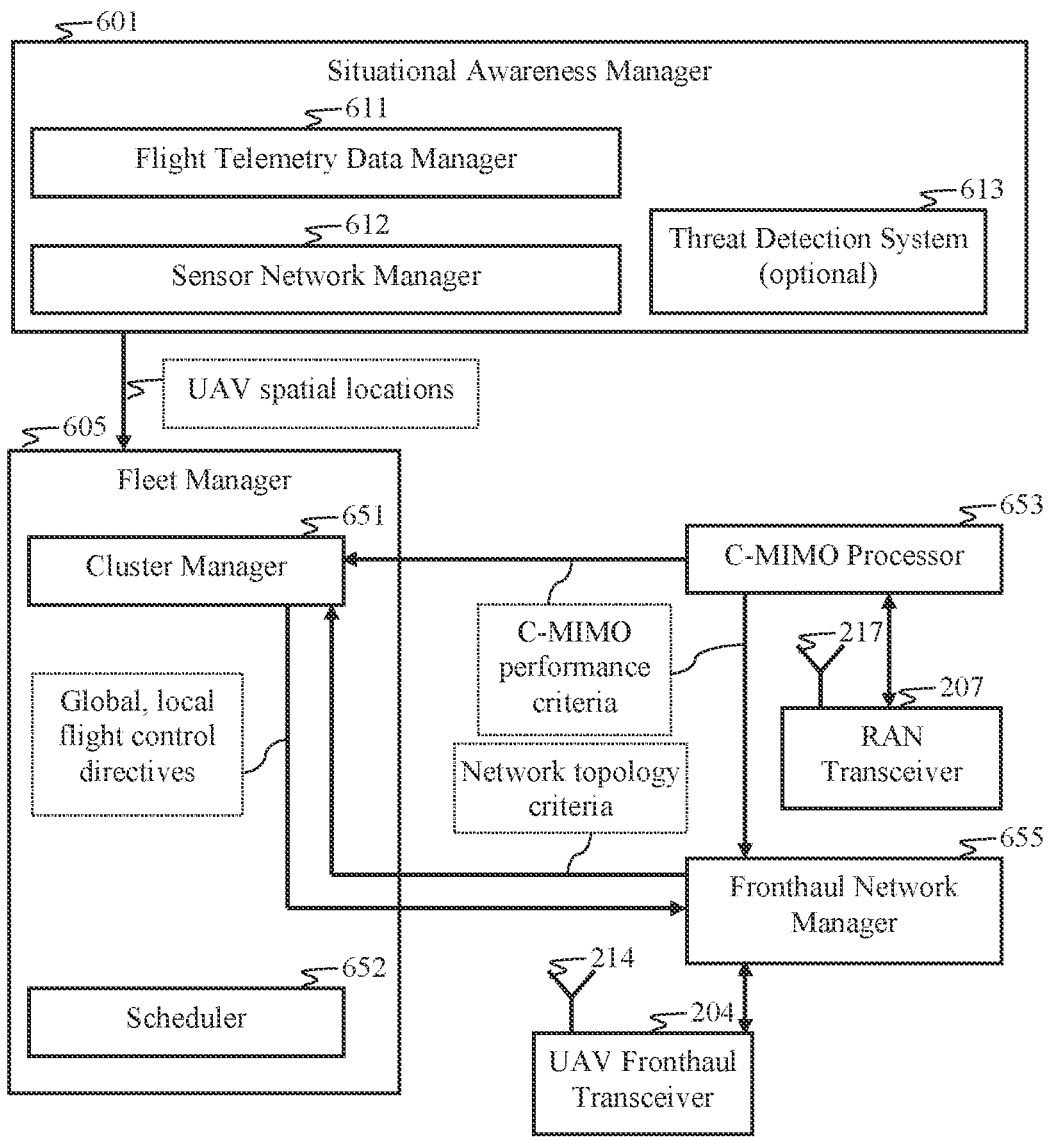
FIG. 6 is a block diagram of a UAV in accordance with certain aspects of the disclosure.

In accordance with one aspect of the disclosure, the apparatus depicted in FIG. 6 can be configured to perform the following method. The apparatus as a whole, or any of its components, can be implemented in a centralized or distributed manner. In aspects of distributed operation, one or more blocks may comprise components residing on multiple UAVs. In aspects of centralized operation, the apparatus resides in a central coordinator (such as a CP or a UAV cluster head).

Fleet Manager 605 uses a Cluster Manager 651 to coordinate navigation of individual UAVs in the cluster via flight rules, which can include a combination of global flight control directives (e.g., flight plans, flight boundaries, obstacle locations, etc.) and local flight control directives (e.g., aircraft separation, collision avoidance, other autonomous flight control rules, etc.). Some directives can be provided with higher priority than other directives such that the UAV responds to such directives according to a hierarchy of priority. For example, a UAV might enact a global flight control directive within boundaries established by its local flight control directives.

Inputs to the Cluster Manager 651 are received from Situational Awareness Manager 601, and can comprise UAV spatial location data for UAVs in a cluster. This data may include UAV flight telemetry data, remote sensing data, other UAV position data, and/or combinations thereof. Situational Awareness Manager 601 can comprise a Flight Telemetry Data Manager 611, a Sensor Network Manager 612, and, optionally, a Threat Detection System 613. Cluster manager 651 may receive inputs from Cooperative MIMO Processor 653 to select global and/or local flight directives configured with respect to cooperative MIMO performance criteria, and may select the flight directives within predetermined boundaries of navigation criteria.

Threat Detection System 613 can be configured to target UEs and/or remote-controlled vehicles for mitigation and send corresponding location data to the Fleet Manager 605. Fleet Manager 605 via Scheduler 652 can schedule particular UAVs to perform countermeasures against the target and/or select flight control directives to transmit to particular UAVs, such as to coordinate an attack. In such aspects, Processor 653 can comprise a mitigation system (not shown) configured to exploit a target's radio link to implement a passive and/or active attack.

For distributed processing, Cooperative MIMO Processor 653 communicates with a Fronthaul Network Manager 655, which communicates with the Cluster Manager 651. Fronthaul Network Manager 655 communicates network topology criteria to the Cluster Manager 651 to adapt Global and/or Local flight control directives to adapt a fronthaul network topology.

Cluster Manager 651 via the Scheduler 652 schedules UAVs to operate in a cluster. Scheduler 652 can assign UAVs to a cluster. By way of example, Scheduler 652 operating in cooperation with the Processor 653 and/or Manager 655 can assign duties to individual UAVs, including signal processing, data storage, and/or routing functions.

Responsive to operating criteria input by the Cooperative MIMO Processor 653, the Fronthaul Network Manager 655 formulates the network topology such that a network routing topology operates with links within defined tolerances, such as below a latency threshold, above a data bandwidth threshold, above a QoS threshold, above a reliability threshold, above a BER threshold, above an SNR threshold, and the like. Fronthaul Network Manager 655 may request that Cluster Manager 651 adapt UAV spatial locations to enable the network to operate within the defined tolerances.

Cooperative MIMO Processor 653 is configured to perform distributed beamforming. Use of the term "distributed" has two distinct meanings in the sense of distributed beamforming. The first meaning indicates that the antennas of the array are distributed over the receiving plane, possibly in some randomly structured fashion. This is a departure from traditional beamforming, which relies on a strict, uniform placement of the antenna elements to reduce the complexity of the analysis through the removal of dependence on the individual locations of nodes within the arrays. When the node locations are no longer structured, the location of each element must be considered on its own, rather than simply considering the location of the array as a whole. In this scenario, the elements are still controlled by some central source; thus the locations, phase offsets, and transmit capabilities of each node could be known quantities which are used to produce weight calculations. The second meaning builds on the first, implying that the elements are not only distributed in terms of location, but are also independent processing units, such as UAVs and UEs. This second scenario typically limits the quantity and quality of information available to a beamformer.

In one aspect, methods for determining complex weights are distributed in the sense that they can be performed by each node individually without sharing significant amounts of information. In another aspect, the nodes can share the total amount of information about themselves, such as through some pre-communication phase. In this case, nearly ideal weights might be calculated based on the global information and disseminated through the fronthaul network by a single cluster head. A combination of these aspects can be performed. For example, optical communication enables vast amounts of data bandwidth, particularly for short-range communications, so lots of CSI (as well as MIMO processing information) can be shared locally. This can facilitate distributed processing, such as cloud computing. This provides a central coordinator (e.g., a cluster head) with enough information to perform global MIMO processing (or at least one level above local MIMO processing) while enabling the central coordinator to exploit distributed computing resources, the availability of which can increase with the cooperative-MIMO array size.

A method for determining complex MIMO weights according to one aspect comprises the following steps. First, a constraint is chosen, such as the SNR at the receive nodes. However any quantifiable quantity can be chosen, such as the capacity of the total link, the total power consumption, the per-node power consumption, etc. Second, an analytical derivation for the optimized value of interest is created based on the relay network model, and a method for iteratively reaching that optimum is presented. Finally, the problem is broken up such that the transmitter array and/or the receiver array can calculate a single coverage parameter that leads the individual nodes to find their own optimum weights, distributing the calculation over the network.

When a target is moving, or ideal weight calculations are not possible due to lack of information, an adaptive method may be used to home in on ideal weights, such as by iteratively changing the phases based on the array performance. This leads to distributive smart antennas that are capable of compensating for movement within the array, target, source, channel, and interferers, and adapting to other changes in the channel. In order to arrive at the ideal weights (or at least a local maxima) without full CSI, attempts to iteratively find the optimum weighting at each relay using one bit feedback from the destination node can be used. For example, using plus/minus perturbation, the next weight is perturbed twice during transmission, and the feedback bit specifies which of the two is best.

In another aspect, a cluster of UAVs providing RAN service to a set of UEs is configured to adapt navigation parameters to improve the RAN service. A perturbation to course, cluster flight formation, and/or altitude can be used to adapt the cluster to seek improved array performance. For example, a constraint is chosen, such as SNR, eigenvalues corresponding to MIMO eigenvectors, or another measurable parameter. Based on the constraint, the UAVs can measure the constraint directly from signals received from the set of UEs, and/or the set of UEs can measure the constraint and return feedback information to the UAVs. Then the perturbation to the cluster's heading and/or other flight characteristics is performed. Measurements of the constraint(s) are made by the UAVS and/or the UEs and are processed (possibly by at least one central authority) to distinguish the effects due to the perturbation from effects due to other changes in the channel. There are many techniques to distinguish the perturbation effects from other effects, and the invention is not limited to particular techniques. In one aspect, effects characterized by variances having a zero mean can be averaged out with a sufficient number of samples.

In accordance with one aspect, a singular value decompositions (SVD) can be used to obtain beamforming weights using global CSI. The SVD method allows the transmitter to precode data x sent over a MIMO channel h with the left decomposition of the channel v and the receiver to decode with the right decomposition u, giving the received vector:

$$y = u^H H v x + u^H n$$

An iterative method can be used for calculating the right SVD vector, relying on blind adaptive methods for calculating of the left. This method works by treating the multiple paths as parallel SISO links with gain specified by the diagonal elements of the SVD, allowing nodes to calculate their ideal weights based on their local element. The amount of information sent over the feedback channel can be reduced by using a predictor to estimate the value of the current singular vectors at each transmitting node rather than feeding back the vector in each iteration. After each iteration of the transmission, the values of the singular vector are transmitted back to the relay if the difference between the estimated values and the calculated values exceed a set threshold, allowing for a balance between performance and the overhead in the control channel.

Precoding algorithms for SDMA systems include linear and nonlinear precoding types. The capacity achieving algorithms are nonlinear, but linear precoding usually achieves reasonable performance with much lower complexity. Linear precoding strategies include maximum ratio transmission (MRI), zero-forcing (ZF) precoding, and transmit Wiener precoding. There are also precoding strategies tailored for low-rate feedback of CSI, for example random beamforming. Nonlinear precoding is designed based on the concept of dirty paper coding (DPC), which shows that any known interference at the transmitter can be subtracted without the penalty of radio resources if the optimal precoding scheme can be applied on the transmit signal. In DPC, only the transmitter needs to know this interference, but full CSI is required everywhere to achieve the weighted sum capacity. This category includes Costa precoding, Tomlinson-Harashima precoding, and the vector perturbation technique.

While performance maximization has a clear interpretation in point-to-point MIMO, a multi-user system cannot simultaneously maximize the performance for all users. This can be viewed as a multi-objective optimization problem where each objective corresponds to maximization of the capacity of one of the users. The usual way to simplify this problem is to select a system utility function; for example, the weighted sum capacity where the weights correspond to the system's subjective user priorities.

In some aspects, the precoding weights for each user can be selected to maximize a ratio between the signal gain at this user and the interference generated at other users (with some weights) plus noise. Thus, precoding can be interpreted as finding the optimal balance between achieving strong signal gain and limiting inter-user interference. Finding the optimal weighted MMSE precoding can be difficult, leading to approximation approaches where the weights are selected heuristically. In such aspects, swarm intelligence may be employed as part of the weight selection.

One approximation approach is MRT, which only maximizes the signal gain at the intended user. MRT is close to optimal in noise-limited systems, in which inter-user interference is negligible compared to the noise. ZF precoding aims at nulling the inter-user interference, at the expense of losing some signal gain. ZF precoding can achieve performance close to the sum capacity when the number of users is large or the system is interference-limited (i.e., the noise is weak compared to the interference). A balance between MRT and ZF is obtained by the so-called regularized zero-forcing (also known as signal-to-leakage-and-interference ratio (SLNR) beamforming and transmit Wiener filtering) All of these heuristic approaches can be applied to receivers that have multiple antennas.

In practice, the CSI is limited at the transmitter due to estimation errors and quantization. If the complete channel knowledge is fed back with good accuracy, then one can use strategies designed for having full channel knowledge with minor performance degradation. Quantization and feedback of CSI is based on vector quantization, and codebooks based on Grassmannian line packing have shown good performance. In spatially correlated environments, the long-term channel statistics can be combined with low-rate feedback to perform multi-user precoding. As spatially correlated statistics contain much directional information, it is only necessary for users to feed back their current channel gain to achieve reasonable channel knowledge.

Beamforming algorithms require access to CSI, upon which the calculation of the optimal beamforming weights is based. The optimality criterion to determine these weights can sometimes involve minimizing the total transmitted power at the relays, subject to satisfying desirable SINR levels at all destinations. Centralized optimization methods, which involve a central processing unit that collects the global CSI and then transmits the optimal weights to all beamformers, incur a large communication cost. They can also entail significant delays, giving rise to the need for distributed techniques wherein each beamformer must calculate its optimal weights based on local information only.

Typically, the greatest overhead in distributed beamforming is the sharing of locations or CSI between the nodes to allow for weight calculations across the network. While methods for calculating these weights in a distributed fashion try to share as little data as necessary, aspects of the disclosure can exploit the large data bandwidth of local-area communications between UAV relay nodes. UWB, optical communications, and other WLAN and WPAN technologies can permit large volumes of data to be shared by cooperating nodes.

Starting with an initial estimate of ideal weights, the individual nodes can continue to refine their own weights locally using only a parameter based on the combination of the transmissions in the uplink, which is fed back from the receiver. In one aspect, the second-order statistic calculation includes multiple source-transmitter pairs, adjusting the weights at the relay nodes to optimize the signal at several receivers rather than just one.

Some aspects can employ a distributed optimization algorithm which allows for autonomous computation of the beamforming decisions by each cluster while taking into account intra- and inter-cluster interference effects. Various algorithms may be employed in different aspects, including (but not limited to): an augmented Lagrangians (AL), which is a regularization technique that is obtained by adding a quadratic penalty term to the ordinary Lagrangian. AL methods converge very fast, especially compared to first order methods; dual decomposition methods, which have the decomposability properties of the ordinary Lagrangian; Accelerated Distributed Augmented Lagrangians (ADAL) algorithms, which are an AL decomposition method that produces very fast convergence rates; alternative AL decomposition techniques for general convex optimization problems; other distributed methods utilizing dual decomposition for the multi-cell downlink beamforming problem; and an Alternating Directions Method of Multipliers (ADMM) technique.

Some aspects can be adapted to the problem of cooperative beamforming in relay networks where multiple clusters of source-destination node pairs, along with their dedicated relays, coexist in space. Utilizing the Semi-definite Relaxation technique, the problem can be approximated in convex programming form and solved using a distributed optimization algorithm that allows for autonomous computation of the optimal beamforming decisions by each cluster. This approach can combine low computational complexity with the robustness and convergence speed of regularization while requiring minimal communication overhead.

It should be appreciated that apparatus and method features disclosed herein might be implemented using any suitable combination of computing devices, including servers, interfaces, systems, databases, agents, peers, engines, controllers, modules, or other types of computing devices operating individually or collectively. One should appreciate that computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed herein with respect to the disclosed apparatus and method aspects.

The invention claimed is:

1. An unmanned aerial vehicle (UAV), comprising:
    a power source;
    a propulsion engine that uses the power source to generate at least one of lift or directional control for the UAV;
    a first baseband processor to establish a first communication link with a ground station of a wireless network via a first antenna;
    a second baseband processor for processing a radio transmission from a user equipment, the radio transmission being received via a second antenna, the second baseband processor being communicatively coupled to the first baseband processor such that the radio transmission is communicated to the ground station via the first communication link; and
    flight control hardware that steers the UAV along a flight trajectory that is determined by a ground-based UAV controller based at least on the radio transmission, such that the UAV or the ground station can locate or track the user equipment.

2. The UAV of claim 1, wherein the flight control hardware is further configured to perform autonomous navigation in coordination with other UAVs using decentralized controls and self-organization.

3. The UAV of claim 1, wherein the ground station is a base station in a ground network cell, and the ground network cell is connected to a core network of a wireless carrier network via a backhaul.

4. The UAV of claim 1, further comprising at least one sensor that comprises a camera, a microphone, a radar, a lidar, or an acoustic sensor; the at least one sensor producing remote-sensing data and communicating the remote sensing data to the ground station via the first communication link.

5. The UAV of claim 1, wherein the UAV is a cluster head for a UAV group, and wherein the UAV coordinates the UAV group's navigation based at least on the flight trajectory.

6. The UAV of claim 1, wherein the flight control hardware employs navigation criteria configured for performing surveillance.

7. The UAV of claim 1, wherein the flight trajectory comprises air traffic control instructions provided by the ground-based UAV controller.

8. One or more non-transitory computer-readable media of an unmanned aerial vehicle (UAV) storing computer-executable instructions that upon execution cause one or more processors to perform acts comprising:
   establishing a first communication link with a ground station of a wireless network via a first antenna;
   processing a radio transmission from a user equipment, the radio transmission being received via a second antenna;
   communicating the radio transmission to the ground station via the first communication link; and
   steering the UAV along a flight trajectory that is determined by a ground-based UAV controller based at least on the radio transmission, such that the UAV or the ground station can locate or track the user equipment.

9. The one or more non-transitory computer-readable media of claim 8, wherein the steering is further configured to perform autonomous navigation in coordination with other UAVs using decentralized controls and self-organization.

10. The one or more non-transitory computer-readable media of claim 8, wherein the ground station is a base station in a ground network cell, and the ground network cell is connected to a core network of a wireless carrier network via a backhaul.

11. The one or more non-transitory computer-readable media of claim 8, further comprising computer-executable instructions that upon execution cause the one or more processors to collect remote-sensing data from at least one sensor that comprises a camera, a microphone, a radar, a lidar, or an acoustic sensor; and communicate the remote sensing data to the ground station via the first communication link.

12. The one or more non-transitory computer-readable media of claim 8, wherein the UAV is a cluster head for a UAV group, further comprising computer-executable instructions that upon execution cause the one or more processors to coordinate the UAV group's navigation based at least on the flight trajectory.

13. The one or more non-transitory computer-readable media of claim 8, wherein steering employs navigation criteria configured for performing surveillance.

14. The one or more non-transitory computer-readable media of claim 8, wherein the flight trajectory comprises air traffic control instructions provided by the ground-based UAV controller.

15. A method performed by an unmanned aerial vehicle (UAV), comprising:
   establishing a first communication link with a ground station of a wireless network via a first antenna;
   processing a radio transmission from a user equipment, the radio transmission being received via a second antenna;
   communicating the radio transmission to the ground station via the first communication link; and
   steering the UAV along a flight trajectory that is determined by a ground-based UAV controller based at least on the radio transmission, such that the UAV or the ground station can locate or track the user equipment.

16. The method of claim 15, wherein steering is further configured to perform autonomous navigation in coordination with other UAVs using decentralized controls and self-organization.

17. The method of claim 15, wherein the ground station is a base station in a ground network cell, and the ground network cell is connected to a core network of a wireless carrier network via a backhaul.

18. The method of claim 15, further comprising collecting remote-sensing data from at least one sensor that comprises a camera, a microphone, a radar, a lidar, or an acoustic sensor; and communicating the remote sensing data to the ground station via the first communication link.

19. The method of claim 15, wherein the UAV is a cluster head for a UAV group, and the UAV coordinates the UAV group's navigation based at least on the flight trajectory.

20. The method of claim 15, wherein steering employs navigation criteria configured for performing surveillance.

21. The method of claim 15, wherein the flight trajectory comprises air traffic control instructions provided by the ground-based UAV controller.

* * * * *